(12) United States Patent  
Zhou

(10) Patent No.: US 12,367,686 B2
(45) Date of Patent: Jul. 22, 2025

(54) ROAD STRUCTURE DETECTION METHOD AND APPARATUS

(71) Applicant: Shenzhen Yinwang Intelligent Technologies Co., Ltd., Shenzhen (CN)

(72) Inventor: Wei Zhou, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 234 days.

(21) Appl. No.: 17/833,456

(22) Filed: Jun. 6, 2022

(65) Prior Publication Data

US 2022/0309806 A1 Sep. 29, 2022

Related U.S. Application Data

(63) Continuation of application No. PCT/CN2020/134225, filed on Dec. 7, 2020.

(30) Foreign Application Priority Data

Dec. 6, 2019 (CN) .......................... 201911245257.2

(51) Int. Cl.
*G06V 20/56* (2022.01)
*B60W 60/00* (2020.01)

(52) U.S. Cl.
CPC ......... *G06V 20/588* (2022.01); *B60W 60/001* (2020.02); *B60W 2552/05* (2020.02); *B60W 2552/10* (2020.02); *B60W 2552/53* (2020.02)

(58) Field of Classification Search
CPC ... G06V 20/588; G06V 10/82; B60W 60/001; B60W 2552/05; B60W 2552/10;
(Continued)

(56) References Cited

U.S. PATENT DOCUMENTS 9,494,438 B1 11/2016 Ichinokawa
10,859,395 B2 * 12/2020 Wheeler ................. G06T 17/05
(Continued)

FOREIGN PATENT DOCUMENTS

CN 104149783 A 11/2014
CN 104554259 A 4/2015
(Continued)

*Primary Examiner* — James J Lee
*Assistant Examiner* — Jonathan E Reinert
(74) *Attorney, Agent, or Firm* — Leydig, Voit & Mayer, Ltd.

(57) ABSTRACT

This application provides a road structure detection method and apparatus. The method includes: determining boundary information of a host lane and boundary information of an adjacent lane, and determining road structure information based on the boundary information of the host lane and the boundary information of the adjacent lane. The boundary information of the host lane is used to represent a location of a boundary of the current lane. The boundary information of the adjacent lane is used to represent a location of a boundary of the adjacent lane. The boundary information includes lane line information and/or location information of a lane boundary. The road structure information includes location information of a merge point (A) of the host lane and the adjacent lane and/or a split point (B) of the host lane and the adjacent lane.

15 Claims, 15 Drawing Sheets

(58) Field of Classification Search
CPC ............. B60W 2552/53; B60W 40/06; B60W 40/105; B60W 50/0098; B60W 2050/0043; B60W 2050/0075; G01S 13/931

See application file for complete search history.

(56) References Cited

U.S. PATENT DOCUMENTS

| | | |
|---|---|---|
| 2010/0246889 A1 | 9/2010 | Nara et al. |
| 2013/0311086 A1 | 11/2013 | Aoki et al. |
| 2016/0046290 A1 | 2/2016 | Aharony et al. |
| 2018/0188060 A1 | 7/2018 | Wheeler et al. |
| 2019/0088137 A1 | 3/2019 | Yamada et al. |
| 2019/0106107 A1* | 4/2019 | Miura ............. B60W 30/18154 |
| 2020/0149896 A1* | 5/2020 | Bush ................... G05D 1/0274 |

FOREIGN PATENT DOCUMENTS

| | | |
|---|---|---|
| CN | 109186615 A | 1/2019 |
| CN | 110160552 A | 8/2019 |
| CN | 110361015 A | 10/2019 |
| CN | 110361021 A | 10/2019 |
| CN | 110386065 A | 10/2019 |
| DE | 102018007298 A1 | 3/2019 |
| JP | 2015102893 A | 6/2015 |
| JP | 2018044833 A | 3/2018 |

\* cited by examiner

ROAD STRUCTURE DETECTION METHOD AND APPARATUS

CROSS-REFERENCE TO RELATED APPLICATIONS

This application is a continuation of International Patent Application No. PCT/CN2020/134225, filed on Dec. 7, 2020, which claims priority to Chinese Patent Application No. 201911245257.2, filed on Dec. 6, 2019. The disclosures of the aforementioned applications are hereby incorporated by reference in their entireties.

TECHNICAL FIELD

Embodiments of this application relate to the field of autonomous driving, and in particular, to a road structure detection method and apparatus.

BACKGROUND

In autonomous driving, an intelligent vehicle needs to sense a surrounding environment. The intelligent vehicle may detect and classify environments around the vehicle by using a plurality of sensors, and transmit information to a planning and control module, to develop a driving policy for the intelligent vehicle for completing an entire process of autonomous driving.

Road structure detection is relatively important in a driving process, so that the intelligent vehicle can adjust the driving policy based on the road structure, avoid obstacles on some roads, and implement better autonomous driving. Currently, an existing road structure detection technology is to obtain some lane information and the like by using a high-definition map to determine the road structure. However, the high-definition map usually covers limited areas. When a driving area is not covered in the high-definition map, the intelligent vehicle cannot obtain corresponding information, and further cannot determine the road structure.

SUMMARY

This application provides a road structure detection method and apparatus, to implement road structure detection without relying on a high-definition map.

To achieve the foregoing objective, the following technical solutions are used in this application.

According to a first aspect, this application provides a road structure detection method. The method may be performed by an intelligent vehicle (or a component in the vehicle) or another device (or a component in the another device) having a control function. The method includes: determining boundary information of a host lane and boundary information of an adjacent lane, and determining road structure information based on the boundary information of the host lane and the boundary information of the adjacent lane. The boundary information of the host lane is used to represent a location of a boundary of the current lane. The boundary information of the adjacent lane is used to represent a location of a boundary of the adjacent lane. The boundary information includes lane line information and/or location information of a lane boundary. The road structure information includes location information of a merge point of the host lane and the adjacent lane and/or a split point of the host lane and the adjacent lane.

For example, a boundary between lanes may be marked with paint, or with a raised object (for example, a guardrail or a cement pier). Certainly, there may be another boundary marking manner.

It can be learned that, the road structure detection method provided in this embodiment of this application can complete road structure detection in an area not covered in a high-definition map, that is, the high-definition map is not needed. In other words, the road structure detection method provided in this application has a wider application scope, that is, can be applied to an area covered in the high-definition map and an area not covered in the high-definition map.

In a possible implementation, the lane line may be drawn on a road surface by using paint. In this way, visual information of the lane line may be collected by using a visual sensor (for example, a camera), to determine a location of the lane line. The lane boundaries may be differentiated between by a raised object (for example, a guardrail), so that a specific wave may be emitted using a radar or a similar component, and a transmitted wave of the raised object at the lane boundary is obtained. Then, a location of the lane boundary is obtained based on features (such as a phase difference and a frequency difference) of the transmitted wave and a reflected wave. Certainly, visual information of the lane boundaries such as the guardrail may also be collected by the camera or the like, to determine location information of the guardrail.

In a possible implementation, the boundary information of the adjacent lane is determined based on detected vehicle trajectory information and/or road edge information, and the road edge information is used to represent a location of a road edge.

In other words, the boundary information of the adjacent lane may be determined based on the detected vehicle trajectory information, the boundary information of the adjacent lane may be determined based on the road edge information, or the boundary information of the adjacent lane may be determined based on both the detected vehicle trajectory information and the road edge information.

Visual information of a vehicle in the adjacent lane may be collected by using a visual sensor of the vehicle, for example, a camera, to determine the detected vehicle trajectory information. Alternatively, a radar in the vehicle or a component having a similar function may be used to determine information such as a location and a speed of a vehicle in another lane by using a transmit and receive laser, a millimeter wave, or the like, so as to determine vehicle trajectory information of the another lane. Certainly, the vehicle trajectory information of the another lane may alternatively be determined in another manner.

When a road edge line is marked by a planar pattern made of paint, or the like, components such as a camera may be used to collect visual information of the road edge line, so as to determine a location of the road edge, namely, the road edge information. When a raised object (for example, a guardrail or a cement pier) is used to differentiate between road boundaries, the road edge information may also be determined by using the camera or by components such as a radar.

It can be learned that, in the technical solution of this application, the boundary information of the adjacent lane is inferred based on the road edge information and/or the detected vehicle trajectory information, rather than through direct detection by the camera. In this way, the following problem can be avoided to some extent: When a lane line location of the adjacent lane is directly collected by the camera, the lane line location of the adjacent lane cannot be collected or the collected lane line location of the adjacent lane is inaccurate due to poor detection performance (for example, a relatively small detection distance) of the camera or an environmental factor (for example, haze).

In a possible implementation, the boundary information of the adjacent lane includes at least one of the following:
  location information of a left lane line RL of a right adjacent lane;
  location information of a right lane line LR of a left adjacent lane;
  location information of a left boundary of the right adjacent lane; and
  location information of a right boundary of the left adjacent lane.

In a possible implementation, when there is a merge point or a split point between the host lane and the right adjacent lane, a location of the merge point or the split point needs to be determined based on the boundary information of the host lane and boundary information of the right adjacent lane. Herein, the boundary information of the right adjacent lane needs to be determined first.

When the lane boundary is marked with paint, the boundary information of the right adjacent lane refers to a location of the left lane line (RL) of the right adjacent lane. The location of the RL may be derived from the road edge information. Specifically, a first location of the RL is obtained by translating the road edge to the left by a first width. Alternatively, the RL location is derived from a vehicle trajectory of another lane. Specifically, a second location of the RL is obtained by translating the vehicle trajectory to the left by a second width. Alternatively, the RL location may be jointly derived from the road edge location and the vehicle trajectory of the another lane. Specifically, a third location (which may be referred to as a fusion location) of the RL is obtained by fusing the first location of the RL and the second location of the RL by using a preset algorithm. In this way, when a location with poor accuracy exists in the first location and the second location, a deviation between the fusion location and a location of an actual merge point (and/or a split point) can be corrected, thereby improving accuracy of a finally determined location result.

When the lane boundary is marked by using a raised object or in a similar manner, the boundary information of the right adjacent lane refers to a location of the left boundary of the right adjacent lane. The location of the left boundary may be derived from the road edge location. Specifically, a seventh location of the left boundary of the right adjacent lane is obtained by translating the road edge to the left by a fifth width. Alternatively, the location of the left boundary may be derived from a vehicle trajectory of another lane. Specifically, an eighth location of the left boundary is obtained by translating the vehicle trajectory to the left by a sixth width. Alternatively, the location of the left boundary may be derived from both the road edge location and the vehicle trajectory of the another lane. Specifically, a ninth location of the left boundary is obtained by fusing the seventh location of the left boundary and the eighth location of the left boundary by using the preset algorithm.

Similarly, when the lane boundary is marked with paint, the boundary information of the left adjacent lane refers to a location of the right lane line (LR) of the left adjacent lane. A fourth location of the LR is obtained by translating the road edge to the right by a third width. Alternatively, a fifth location of the LR is obtained by translating the vehicle trajectory to the right by a fourth width. Alternatively, a sixth location of the LR is obtained by fusing the fourth location of the LR and the fifth location of the LR by using the preset algorithm.

When the lane boundary is marked by using a raised object or in a similar manner, the boundary information of the left adjacent lane refers to a location of the right boundary of the left adjacent lane. A tenth location of the right boundary of the left adjacent lane is obtained by translating the road edge to the right by a seventh width. Alternatively, an eleventh location of the right boundary is obtained by translating the vehicle trajectory to the right by an eighth width. Alternatively, a twelfth location of the right boundary is obtained by fusing the tenth location of the right boundary and the eleventh location of the right boundary by using the preset algorithm.

The first width is an integer multiple of a lane width, the second width is an odd multiple of a half-lane width, the third width is an integer multiple of the lane width, the fourth width is an odd multiple of the half-lane width, the fifth width is an integer multiple of the lane width, the sixth width is an odd multiple of the half-lane width, the seventh width is an integer multiple of the lane width, and the eighth width is an odd multiple of the half-lane width.

In a possible implementation, a distance between the merge point and a reference point is less than or equal to a first threshold, and/or a distance between the split point and the reference point is less than or equal to the first threshold. The reference point includes a vehicle.

When a distance between a preliminarily determined merge point and the vehicle is less than or equal to the first threshold, it is considered that the preliminarily determined location of the merge point is accurate and needs no further adjustment.

In a possible implementation, when the distance between the preliminarily determined merge point and the vehicle is less than or equal to the first threshold, the reason may be as follows: During determining of the boundary information of the adjacent lane, the first width and/or the second width and/or the third width and/or the fourth width and/or the fifth width and/or the sixth width and/or the seventh width and/or the eighth width required for translation of the road edge and/or the vehicle trajectory are/is inaccurate, causing inaccurate locations of the preliminarily determined merge point and/or split point. In this case, the location of the merge point and/or the location of the split point need/needs to be further adjusted to improve accuracy of a road structure detection result. Specifically, the first width and/or the second width and/or the third width and/or the fourth width and/or the fifth width and/or the sixth width and/or the seventh width and/or the eighth width are/is adjusted based on the first threshold, and the merge point is adjusted based on the adjusted first width and/or second width and/or third width and/or fourth width and/or fifth width and/or sixth width and/or seventh width and/or eighth width; and/or the first width and/or the second width and/or the third width and/or the fourth width and/or the fifth width and/or the sixth width and/or the seventh width and/or the eighth width are/is adjusted based on the first threshold, and the split point is adjusted based on the adjusted first width and/or second width and/or third width and/or fourth width and/or fifth width and/or sixth width and/or seventh width and/or eighth width.

In the foregoing technical solution, a required width for translation of the road edge location and/or a required width for translation of the vehicle trajectory are/is adjusted, and the boundary information of the adjacent lane is determined based on the adjustment, so that the obtained boundary information of the adjacent lane is more accurate and the determined location of the merge point (and/or the split point) is more accurate. A more precise driving policy may be formulated based on the accurate location of the merge point (and/or the split point), to guide vehicle driving and improve driving safety.

In a possible implementation, the first threshold is determined by using a sensing range of a sensor, or the first threshold is a pre-configured value.

In a possible implementation, the boundary information of the adjacent lane is determined based on road prior data, and the road prior data includes the lane width.

According to a second aspect, this application provides a road structure detection apparatus. The apparatus may be a vehicle, or may be an apparatus that can support a vehicle in implementing a driving function, and may be used in combination with the vehicle. For example, the apparatus may be an apparatus in a vehicle (for example, a chip system in a vehicle, or an operating system and/or a driver running on a computer system of the vehicle), or may be another device (for example, a server) or a chip in the device. The apparatus includes a determining module and an adjustment module, and the modules may perform the road structure detection method in any one of the example designs of the first aspect.

The determining module is configured to: determine boundary information of a host lane, where the boundary information of the host lane is used to represent a location of a boundary of the current lane; and determine boundary information of an adjacent lane, where the boundary information of the adjacent lane is used to represent a location of a boundary of the adjacent lane. The boundary information includes lane line information and/or location information of a lane boundary.

The determining module is further configured to determine road structure information based on the boundary information of the host lane and the boundary information of the adjacent lane, where the road structure information includes location information of a merge point of the host lane and the adjacent lane and/or a split point of the host lane and the adjacent lane.

In a possible design, the boundary information of the adjacent lane is determined based on detected vehicle trajectory information and/or road edge information, and the road edge information is used to represent a location of a road edge.

In a possible design, the boundary information of the adjacent lane includes at least one of the following:
location information of a left lane line RL of a right adjacent lane;
location information of a right lane line LR of a left adjacent lane;
location information of a left boundary of the right adjacent lane; and
location information of a right boundary of the left adjacent lane.

In a possible design, a first location of the RL is obtained by translating the road edge to the left by a first width. Alternatively, a second location of the RL is obtained by translating the vehicle trajectory to the left by a second width. Alternatively, a third location of the RL is obtained by fusing the first location of the RL and the second location of the RL by using a preset algorithm.

A fourth location of the LR is obtained by translating the road edge to the right by a third width. Alternatively, a fifth location of the LR is obtained by translating the vehicle trajectory to the right by a fourth width. Alternatively, a sixth location of the LR is obtained by fusing the fourth location of the LR and the fifth location of the LR by using the preset algorithm.

A seventh location of the left boundary of the right adjacent lane is obtained by translating the road edge to the left by a fifth width. Alternatively, an eighth location of the left boundary is obtained by translating the vehicle trajectory to the left by a sixth width. Alternatively, a ninth location of the left boundary is obtained by fusing the seventh location of the left boundary and the eighth location of the left boundary by using the preset algorithm.

A tenth location of the right boundary of the left adjacent lane is obtained by translating the road edge to the right by a seventh width. Alternatively, an eleventh location of the right boundary is obtained by translating the vehicle trajectory to the right by an eighth width. Alternatively, a twelfth location of the right boundary is obtained by fusing the tenth location of the right boundary and the eleventh location of the right boundary by using the preset algorithm.

The first width is an integer multiple of a lane width, the second width is an odd multiple of a half-lane width, the third width is an integer multiple of the lane width, the fourth width is an odd multiple of the half-lane width, the fifth width is an integer multiple of the lane width, the sixth width is an odd multiple of the half-lane width, the seventh width is an integer multiple of the lane width, and the eighth width is an odd multiple of the half-lane width.

In a possible design, a distance between the merge point and a reference point is less than or equal to a first threshold, and/or a distance between the split point and the reference point is less than or equal to the first threshold. The reference point includes a vehicle.

In a possible design, the adjustment module is configured to: adjust the first width and/or the second width and/or the third width and/or the fourth width and/or the fifth width and/or the sixth width and/or the seventh width and/or the eighth width based on the first threshold; and adjust the merge point based on the adjusted first width and/or second width and/or third width and/or fourth width and/or fifth width and/or sixth width and/or seventh width and/or eighth width; and/or configured to: adjust the first width and/or the second width and/or the third width and/or the fourth width and/or the fifth width and/or the sixth width and/or the seventh width and/or the eighth width based on the first threshold; and adjust the split point based on the adjusted first width and/or second width and/or third width and/or fourth width and/or fifth width and/or sixth width and/or seventh width and/or eighth width.

In a possible design, the first threshold is determined by using a sensing range of a sensor, or the first threshold is a pre-configured value.

In a possible design, the boundary information of the adjacent lane is determined based on road prior data, and the road prior data includes the lane width.

According to a third aspect, an embodiment of this application provides a road structure detection apparatus. The apparatus has a function of implementing the road structure detection method in any one of the designs of the first aspect. The function may be implemented by using hardware, or may be implemented by executing corresponding software by hardware. The hardware or software includes one or more modules corresponding to the foregoing function.

According to a fourth aspect, a road structure detection apparatus is provided, including a processor. The processor is configured to: after being coupled to a memory and reading instructions in the memory, perform the road structure detection method according to any one of the designs of the first aspect according to the instructions.

The memory may be an external memory of the apparatus. The external memory is coupled to the processor. The memory may alternatively be a memory included in the apparatus. In other words, the apparatus optionally includes the memory.

In addition, the apparatus may further include a communication interface for communication between the apparatus and another device. The communication interface may be but is not limited to a transceiver, a transceiver circuit, or the like.

According to a fifth aspect, an embodiment of this application further provides a computer-readable storage medium including instructions. When the instructions are run on a computer, the computer is enabled to perform the method in the first aspect.

According to a sixth aspect, an embodiment of this application further provides a computer program product including instructions. When the computer program product runs on a computer, the computer is enabled to perform the method in the first aspect.

According to a seventh aspect, an embodiment of this application provides a road structure detection apparatus. The detection apparatus may be a sensor apparatus, for example, a radar apparatus. The apparatus may alternatively be a chip system. The chip system includes a processor, and may further include a memory configured to implement the function of the method in the first aspect. The chip system may include a chip, or may include a chip and another discrete device.

According to an eighth aspect, a road structure detection apparatus is provided. The apparatus may be a circuit system. The circuit system includes a processing circuit, and the processing circuit is configured to perform the road structure detection method according to any one of the designs of the first aspect.

According to a ninth aspect, an embodiment of this application provides a system. The system includes the apparatus in any one of the second aspect to the fourth aspect, and/or the chip system in the seventh aspect, and/or the circuit system in the eighth aspect, and/or the readable storage medium in the fifth aspect, and/or the computer program product in the sixth aspect, and/or one or more types of sensors, and/or an intelligent vehicle.

The one or more types of sensors may be but are not limited to visual sensors (such as a camera), radars or other sensors having a similar function.

According to a tenth aspect, an embodiment of this application provides an intelligent vehicle, including the apparatus in any one of the second aspect to the fourth aspect, and/or the chip system in the seventh aspect, and/or the circuit system in the eighth aspect, and/or the readable storage medium in the fifth aspect, and/or the computer program product in the sixth aspect.

DESCRIPTION OF EMBODIMENTS

In the specification and accompanying drawings of this application, the terms "first", "second", and so on are intended to distinguish between different objects or to distinguish between different processing for a same object, but do not indicate a particular order of objects. In addition, the terms "include", "have", and any other variant thereof mentioned in descriptions of this application are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device. It should be noted that, in embodiments of this application, words such as "example" and "for example" are used to mean an example, an illustration, or a description. Any embodiment or design scheme described as an "example" or "for example" in embodiments of this application should not be explained as being more preferred or having more advantages than another embodiment or design scheme. To be exact, use of the words such as "example" and "for example" is intended to present a related concept in a specific manner.

A road structure detection method provided in embodiments of this application is applied to an intelligent vehicle, or is applied to another device (for example, a cloud server) having a control function. The vehicle may implement, through components (including hardware and software) included in the vehicle, the road structure detection method provided in embodiments of this application, to be specific, obtain lane line information of a host lane and boundary information of an adjacent lane, and determine road structure information based on the lane line information of the host lane and the boundary information of the adjacent lane. Alternatively, another device (for example, a server) may be configured to implement the road structure detection method in embodiments of this application through the included component, to be specific, obtain lane line information of a host lane and boundary information of an adjacent lane, determine road structure information based on the lane line information of the host lane and the boundary information of the adjacent lane, and send the road structure information to a target vehicle. The road structure information is used for the target vehicle to formulate a driving strategy.

Figure 1:
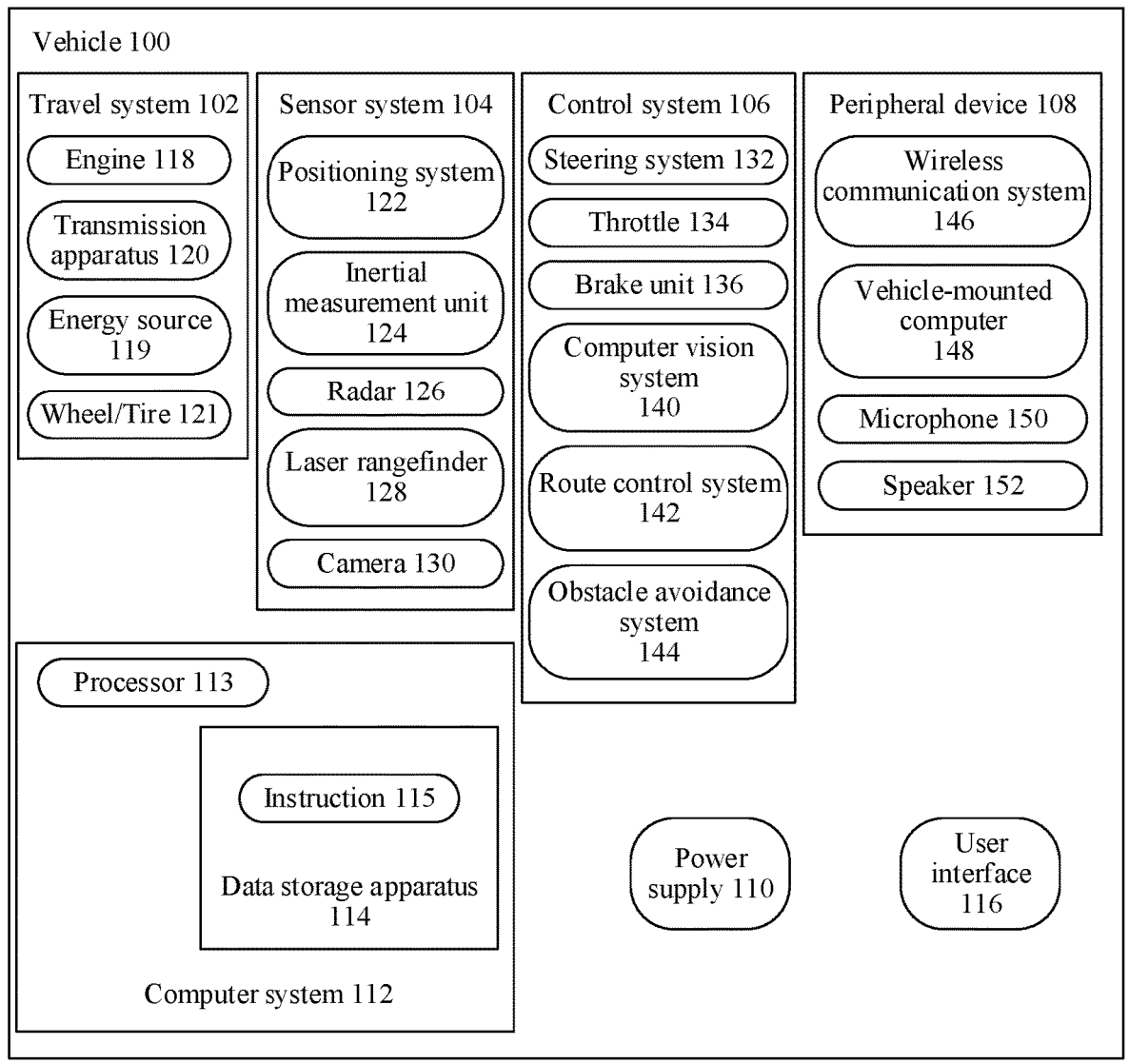
FIG. 1 is a schematic diagram of a structure of an autonomous driving vehicle according to an embodiment of this application.

FIG. 1 is a functional block diagram of a vehicle 100 according to an embodiment of this application. In an embodiment, the vehicle 100 is configured to be in a fully or partially autonomous driving mode. For example, the vehicle 100 may control the vehicle 100 when the vehicle 100 is in an autonomous driving mode, and may determine current statuses of the vehicle and a surrounding environment of the vehicle through a manual operation, determine possible behavior of at least one other vehicle in the surrounding environment, determine a confidence level corresponding to a possibility that the another vehicle performs the possible behavior, and control the vehicle 100 based on determined information. When the vehicle 100 is in the autonomous driving mode, the vehicle 100 may be set to operate without interaction with a person.

The vehicle 100 may include various subsystems, for example, a travel system 102, a sensor system 104, a control system 106, one or more peripheral devices 108, a power supply 110, a computer system 112, and a user interface 116. Optionally, the vehicle 100 may include more or fewer subsystems, and each subsystem may include a plurality of elements. In addition, all the subsystems and elements of the vehicle 100 may be interconnected in a wired or wireless manner.

The travel system 102 may include a component that provides power for the vehicle 100 to move. In an embodiment, the travel system 102 may include an engine 118, an energy source 119, a transmission apparatus 120, and a wheel/tire 121.

The engine 118 may be an internal combustion engine, an electric motor, an air compression engine, or a combination of other types of engines, for example, a hybrid engine including a gasoline engine and an electric motor, or a hybrid engine including an internal combustion engine and an air compression engine. The engine 118 converts the energy source 119 into mechanical energy.

Examples of the energy source 119 include gasoline, diesel, other oil-based fuels, propane, other compressed gas-based fuels, ethanol, solar panels, batteries, and other power sources. The energy source 119 may also provide energy for another system of the vehicle 100.

The transmission apparatus 120 may transmit mechanical power from the engine 118 to the wheel 121. The transmission apparatus 120 may include a gearbox, a differential, and a drive shaft. In an embodiment, the transmission apparatus 120 may further include another component, for example, a clutch. The drive shaft may include one or more shafts that may be coupled to one or more wheels 121.

The sensor system 104 may include several sensors that sense information about a surrounding environment of the vehicle 100. For example, the sensor system 104 may include a positioning system 122 (the positioning system may be a global positioning system (GPS), or may be a BeiDou system or another positioning system), an inertial measurement unit (IMU) 124, a radar 126, a laser rangefinder 128, and a camera 130. The sensor system 104 may further include sensors (for example, an in-vehicle air quality monitor, a fuel gauge, and an oil temperature gauge) in an internal system of the monitored vehicle 100. Sensor data from one or more of these sensors can be used to detect an object and corresponding features (a position, a shape, a direction, a speed, and the like) of the object. Such detection and identification are key functions of a safety operation of the autonomous vehicle 100.

Different types of sensors have different characteristics. A millimeter-wave radar can operate all day with accuracy in sound range and speed measurement, but a classification and identification effect is not good. A camera has a strong resolution and a strong target identification and classification effect, but range and speed measurement performance or the like may be poor due to a loss of depth information. A laser radar has good depth information, and can also perform range and speed measurement, but a detection distance is not long. It can be learned that these different types of sensors have different characteristics. Under different functional requirements, a combination of different sensors needs to be used to achieve better performance.

The positioning system 122 may be configured to estimate a geographical location of the vehicle 100. The IMU 124 is configured to sense location and orientation changes of the vehicle 100 based on an inertial acceleration. In an embodiment, the IMU 124 may be a combination of an accelerometer and a gyroscope.

The radar 126, which is referred to as a radar apparatus, or may be referred to as a detector, a detection apparatus, or a radio signal sending apparatus, can use a radio signal to sense an object in surroundings of the vehicle 100. In some embodiments, in addition to sensing the object, the radar 126 may be further configured to sense a speed and/or a moving direction of the object. An operating principle of the radar 126 is transmitting a signal (or referred to as a sounding signal) and receiving a reflected signal reflected by a target object (also referred to as an echo signal, a two-way echo signal, or the like of the target object in this specification) to detect the corresponding target object.

The radar has a plurality of different radar waveforms for different usage. The radar waveforms include but are not limited to a pulse millimeter wave, a stepped frequency modulated continuous wave, and a linear frequency modulated continuous wave. The linear frequency modulated continuous wave is more common and the technology is more mature. The linear frequency modulated continuous wave has a relatively high time-bandwidth product and usually has relatively high ranging accuracy and resolution. It supports driving assistance functions such as adaptive cruise control (ACC), autonomous emergency braking (AEB), lane change assist (LCA), and blind spot monitoring (BSD).

The laser rangefinder 128 may sense, by using a laser, an object in an environment in which the vehicle 100 is located. In some embodiments, the laser rangefinder 128 may include one or more laser sources, a laser scanner, one or more detectors, and another system component.

The camera 130 may be configured to capture a plurality of images of a surrounding environment of the vehicle 100. The camera 130 may be a static camera or a video camera.

The control system 106 can control operations of the vehicle 100 and the components thereof. The control system 106 may include various elements, including a steering system 132, a throttle 134, a brake unit 136, a computer vision system 140, a route control system 142, and an obstacle avoidance system 144.

The steering system 132 may operate to adjust a moving direction of the vehicle 100. For example, in an embodiment, the steering system may be a steering wheel system.

The throttle 134 is configured to: control an operating speed of the engine 118 and further control a speed of the vehicle 100.

The brake unit 136 is configured to control the vehicle 100 to decelerate. The brake unit 136 may use friction to decelerate the wheel 121. In another embodiment, the brake unit 136 may convert kinetic energy of the wheel 121 into a current. The brake unit 136 may alternatively use another form to reduce a rotational speed of the wheel 121, to control the speed of the vehicle 100.

The computer vision system 140 may operate to process and analyze images captured by the camera 130 to identify objects and/or features in a surrounding environment of the vehicle 100. The objects and/or features may include traffic signals, road boundaries, and obstacles. The computer vision system 140 may use an object recognition algorithm, a structure from motion (SFM) algorithm, video tracking, and other computer vision technologies. In some embodiments, the computer vision system 140 may be configured to: draw a map for an environment, track an object, estimate an object speed, and the like.

The route control system 142 is configured to determine a travel route of the vehicle 100. In some embodiments, the route control system 142 may combine data from the sensor, the positioning system 122, and one or more predetermined maps to determine a travel route for the vehicle 100.

The obstacle avoidance system 144 is configured to identify, evaluate, and avoid or bypass, in another manner, a potential obstacle in an environment of the vehicle 100.

Certainly, for example, the control system 106 may add or alternatively include components other than those shown and described, or may delete some of the components shown above.

The vehicle 100 interacts with an external sensor, another vehicle, another computer system, or a user by using the peripheral device 108. The peripheral device 108 may include a wireless communication system 146, a vehicle-mounted computer 148, a microphone 150, and/or a speaker 152.

In some embodiments, the peripheral device 108 provides a means for a user of the vehicle 100 to interact with the user interface 116. For example, the vehicle-mounted computer 148 may provide information for the user of the vehicle 100. The user interface 116 may further operate the vehicle-mounted computer 148 to receive an input of the user. The vehicle-mounted computer 148 may perform operations through a touchscreen. In another case, the peripheral device 108 may provide a means for the vehicle 100 to communicate with another device or a user that is located within the vehicle. For example, the microphone 150 may receive audio (for example, a voice command or another audio input) from the user of the vehicle 100. Likewise, the speaker 152 may output audio to the user of the vehicle 100.

The wireless communication system 146 may communicate wirelessly with one or more devices directly or through a communications network. For example, the wireless communication system 146 may use 3rd generation (3G) cellular communication such as code division multiple access (CDMA), evolution data only (EVDO), a global system for mobile communications (GSM), a general packet radio service (GPRS), 4th generation (4G) cellular communication such as long term evolution (LTE), or 5th generation (5G) cellular communication. The wireless communication system 146 may communicate with a wireless local area network (WLAN) through wireless fidelity (Wi-Fi). In some embodiments, the wireless communication system 146 may directly communicate with the device by using an infrared link, Bluetooth, or ZigBee. For example, the wireless communication system 146 may include one or more dedicated short range communications (DSRC) devices.

The power supply 110 may supply power to various components of the vehicle 100. In an embodiment, the power supply 110 may be a rechargeable lithium-ion or lead-acid battery. One or more battery packs of such batteries may be configured as a power supply to provide electrical power to the various components of the vehicle 100. In some embodiments, the power supply 110 and the energy source 119 may be implemented together, for example, in some pure electric vehicles.

Some or all functions of the vehicle 100 are controlled by the computer system 112. The computer system 112 may include at least one processor 113. The processor 113 executes instructions 115 stored in a non-transitory computer-readable medium such as a data storage apparatus 114. The computer system 112 may alternatively be a plurality of computing devices that control an individual component or a subsystem of the vehicle 100 in a distributed manner.

The processor 113 may be any conventional processor, for example, a commercially available central processing unit (CPU). Alternatively, the processor may be an application-specific integrated circuit (ASIC) or a dedicated device such as another hardware-based processor. Although FIG. 1 functionally shows a processor, a memory, and other elements in a same physical housing, a person of ordinary skill in the art should understand that the processor, the computer system, or the memory may actually include a plurality of processors, computer systems, or memories that may be in the same physical housing, or may include a plurality of processors, computer systems, or memories that may not be in the same physical housing. For example, the memory may be a hard disk drive or another storage medium located in a different physical housing. Therefore, references to the processor or the computer system will be understood as including references to a set of processors or computer systems or memories that can be operated in parallel, or references to a set of processors or computer systems or memories that may not be operated in parallel. Different from using a single processor to perform the steps described herein, some components such as a steering component and a deceleration component may include respective processors. The processor performs only computation related to a component-specific function.

In various aspects described herein, the processor may be located remote from the vehicle and in wireless communication with the vehicle, and such processor may be referred to as a remote processor. In other aspects, some of the processes described herein are performed on the processor disposed inside the vehicle, while others are performed by a remote processor. The processes include necessary steps for performing a single operation.

In some embodiments, the data storage apparatus 114 may include the instructions 115 (for example, program logic), and the instructions 115 may be executed by the processor 113 to perform various functions of the vehicle 100, including the functions described above. The data storage apparatus 114 may also include additional instructions, including instructions to send data to, receive data from, interact with, and/or control one or more of the travel system 102, the sensor system 104, the control system 106, and the peripheral device 108.

In addition to the instructions 115, the data storage apparatus 114 may further store data, such as a road map, route information, a location, a direction, a speed, and other vehicle data of the vehicle, and other information. Such information may be used by the vehicle 100 and the computer system 112 when the vehicle 100 operates in an autonomous mode, a semi-autonomous mode, and/or a manual mode.

For example, in embodiments of this application, the data storage apparatus 114 obtains lane line information of a host lane from the sensor system 104 or another component of the vehicle 100, and may further obtain detected vehicle trajectory information and/or road edge information from the component. The road edge information is used to represent a location of a road edge. The data storage apparatus 114 may further store the obtained information. For another example, the vehicle obtains, using the speed and range measurement function of the radar 126, a distance between another vehicle and the vehicle, a speed of the another vehicle, and the like. In this way, the processor 113 may obtain the information from the data storage apparatus 114, and determine road structure information based on the information. The road structure information may be used to assist the vehicle in determining a driving policy, to control driving of the vehicle.

The user interface 116 is configured to provide information for or receive information from the user of the vehicle 100. Optionally, the user interface 116 may include one or more input/output devices within a collection of the peripheral device 108, for example, one or more of the wireless communication system 146, the vehicle-mounted computer 148, the microphone 150, and the speaker 152.

The computer system 112 may control functions of the vehicle 100 based on inputs received from various subsystems (for example, the travel system 102, the sensor system 104, and the control system 106) and from the user interface 116. For example, the computer system 112 may use an input from the control system 106 to control the steering system 132 to circumvent obstacles detected by the sensor system 104 and the obstacle avoidance system 144. In some embodiments, the computer system 112 may operate to provide control over many aspects of the vehicle 100 and the subsystems of the vehicle 100.

Optionally, one or more of the foregoing components may be installed separately from or associated with the vehicle 100. For example, the data storage apparatus 114 may exist partially or completely separated from the vehicle 100. The foregoing components may be communicatively coupled together in a wired and/or wireless manner.

Optionally, the foregoing components are merely examples. During actual application, components in the foregoing modules may be added or deleted based on an actual requirement. FIG. 1 should not be construed as a limitation on embodiments of this application.

An intelligent vehicle traveling on a road, for example, the vehicle 100 above, may identify an object in surroundings of the vehicle to determine an adjustment to a current speed. The object may be another vehicle, a traffic control device, or another type of object. In some examples, each identified object may be considered independently, and based on respective characteristics of the objects, such as a current speed, an acceleration, and a distance from the vehicle to the object, a speed to be adjusted for the intelligent vehicle is determined.

Alternatively, the vehicle 100 or a computing device (such as the computer system 112, the computer vision system 140, or the data storage apparatus 114 shown in FIG. 1) associated with the vehicle 100 may predict behavior of the identified object based on the characteristics of the identified object and a status of the surrounding environment (for example, traffic, rain, or ice on the road). Optionally, the identified objects depend on behavior of each other. Therefore, all the identified objects may be considered together to predict behavior of a single identified object. The vehicle 100 can adjust the speed of the vehicle based on the predicted behavior of the identified object. In other words, the intelligent vehicle can determine a steady status to which the vehicle needs to adjust (for example, accelerate, decelerate, or stop) based on the predicted behavior of the object. In this process, another factor may also be considered to determine the speed of the vehicle 100, for example, a horizontal location of the vehicle 100 on a road on which the vehicle travels, a curvature of the road, and proximity between a static object and a dynamic object.

In addition to providing instructions to adjust a speed of the intelligent vehicle, the computing device may also provide instructions to modify a steering angle of the vehicle 100 so that the intelligent vehicle follows a given trajectory and/or maintains safe lateral and vertical distances to the objects (for example, a car in an adjacent lane on the road) in the surroundings of the intelligent vehicle.

The vehicle 100 may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not specifically limited in embodiments of this application.

In some other embodiments of this application, the intelligent vehicle may further include a hardware structure and/or a software module, and implement the functions in a form of the hardware structure, the software module, or a combination of the hardware structure and the software module. Whether a specific function in the foregoing functions is implemented by using the hardware structure, the software module, or the combination of the hardware structure and the software module depends on a specific application and design constraint condition of a technical solution.

Figure 2:
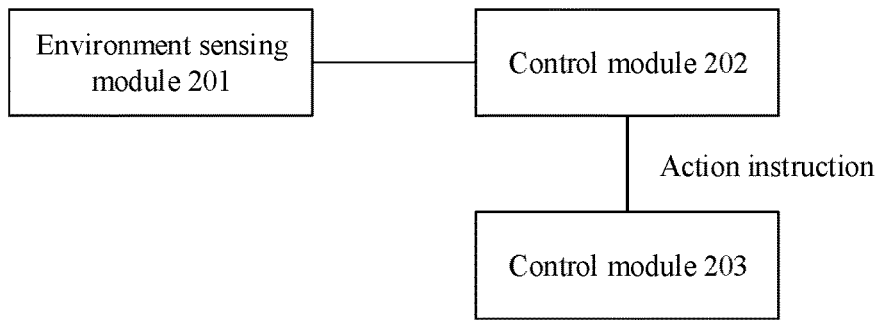
FIG. 2 is a schematic diagram of a structure of an autonomous driving vehicle according to an embodiment of this application.

Referring to FIG. 2, for example, the vehicle may include the following modules: an environment sensing module 201, a control module 202, and a control module 203.

The environment sensing module 201 is configured to obtain information about a vehicle, a pedestrian, and an object on a road identified by a roadside sensor and/or a vehicle-mounted sensor. The roadside sensor and the vehicle-mounted sensor may be cameras, laser radars, millimeter-wave radars, and the like. Data obtained by the environment sensing module may be an originally collected video stream, point cloud data of the radar, or analyzed structured data such as a location, a speed, a steering angle, and a size of a person, a vehicle, and an object. For the original video stream data and the point cloud data of the radar, the environment sensing module may process the data into identifiable structured data such as a location, a speed, a steering angle, and a size of a person, a vehicle, and an object; and transfer the data to the control module 202, so that the control module 202 generates a driving policy. In this embodiment of this application, the environment sensing module 201 includes a camera or a radar, configured to: obtain boundary information of a host lane in which the vehicle is located; and obtain road edge information and/or detected vehicle trajectory information. The road edge information and/or the detected vehicle trajectory information are/is used to determine boundary information of an adjacent lane. The boundary information of the host lane and the boundary information of the adjacent lane are used to determine road structure information.

The control module 202 may be a conventional control module in the vehicle, and is configured to determine the road structure information based on data (the boundary information of the host lane, the vehicle trajectory information, and/or the road edge information) input by the environment sensing module 201. The control module 202 is further configured to fuse the boundary information of the adjacent lane determined based on the vehicle trajectory information and the boundary information of the adjacent lane determined based on the road edge information, to obtain more accurate boundary information of the adjacent lane. The control module 202 is further configured to generate the driving policy based on the road structure information, output an action instruction corresponding to the driving policy, and send the action instruction to the control module 203. The action instruction is used to instruct the control module 203 to control driving for the vehicle. The control module 202 may be a collection of components or subsystems having control and processing functions. For example, the control module 202 may be the processor 113 shown in FIG. 1, some functional modules in the processor, or a similar component or subsystem.

The control module 203 is configured to receive the action instruction from the control module 202, to control the vehicle to complete a driving operation. The control module 203 may be a collection of components or subsystems having control and processing functions. For example, the control module 203 may be the processor 113 shown in FIG. 1 or a similar component or subsystem.

Certainly, the foregoing modules may be further integrated into one module. The integrated module is configured to provide the foregoing plurality of functions.

A vehicle-mounted communication module (not shown in FIG. 2) is configured to exchange information between the vehicle and another vehicle. The vehicle-mounted communication module may be but is not limited to a component in the wireless communication system 146 shown in FIG. 1, or the like.

A storage component (not shown in FIG. 2) is configured to store executable code of the foregoing modules. Some or all of method procedures in embodiments of this application may be implemented by running the executable code. The storage component may be but is not limited to a component in the data storage apparatus 114 shown in FIG. 1.

Figure 3:
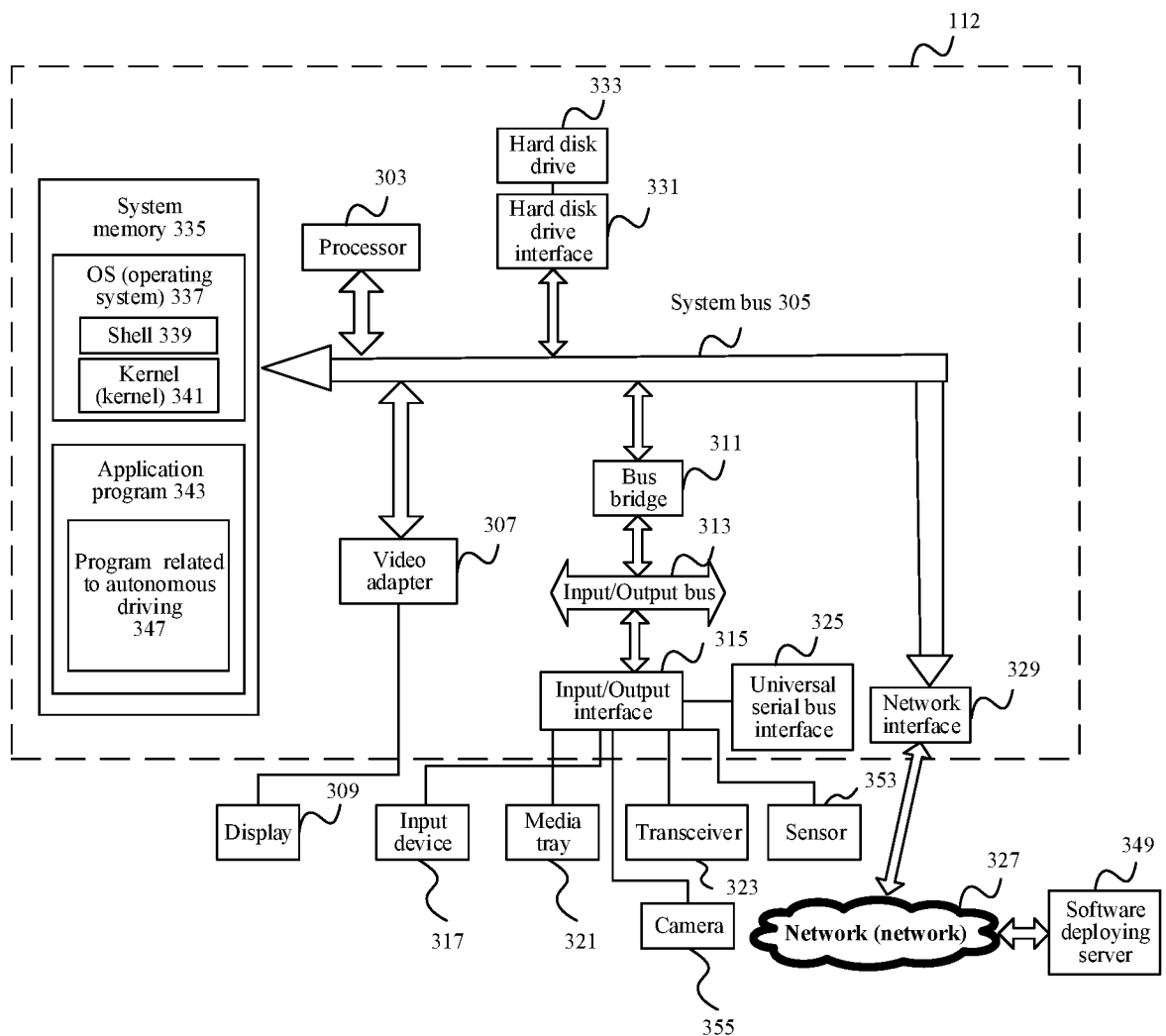
FIG. 3 is a schematic diagram of a structure of a computer system according to an embodiment of this application.

In a possible implementation of this embodiment of this application, as shown in FIG. 3, the computer system 112 shown in FIG. 1 includes a processor 303, and the processor 303 is coupled to a system bus 305. The processor 303 may be one or more processors, and each processor may include one or more processor cores. A video adapter 307 may drive a display 309, which is coupled to the system bus 305. The system bus 305 is coupled to an input/output (I/O) bus (BUS) 313 via a bus bridge 311. An I/O interface 315 is coupled to the I/O bus 313. The I/O interface 315 communicates with a plurality of I/O devices, such as an input device 317 (for example, a keyboard, a mouse, or a touchscreen), a media tray 321 (for example, a CD-ROM or a multimedia interface), a transceiver 323 (which may transmit and/or receive a radio communication signal), a camera 355 (which may capture static and dynamic digital video images), and an external universal serial bus (USB) interface 325. Optionally, an interface connected to the I/O interface 315 may be a USB interface.

The processor 303 may be any conventional processor, including a reduced instruction set computer (RISC) processor, a complex instruction set computer (CISC) processor, or a combination thereof. Optionally, the processor may be a dedicated apparatus such as an application-specific integrated circuit (ASIC). Optionally, the processor 303 may be a neural network processor or a combination of a neural network processor and the foregoing conventional processor.

Optionally, in various embodiments described in this specification, the computer system 112 may be located at a place far away from the vehicle and may wirelessly communicate with the vehicle 100. In another aspect, some processes described in this specification may be performed on a processor disposed in the vehicle, and the other processes are performed by a remote processor, including performing an action required to perform a single operation.

The computer system 112 may communicate with a software deploying server 349 through a network interface 329. The network interface 329 is a hardware network interface, for example, a network interface card. A network 327 may be an external network, such as Internet, or may be an internal network, such as Ethernet or a virtual private network (VPN). Optionally, the network 327 may alternatively be a wireless network, such as a Wi-Fi network or a cellular network.

A hard disk drive interface 331 is coupled to the system bus 305. The hard disk drive interface 331 is connected to a hard disk drive 333. A system memory 335 is coupled to the system bus 305. Data running in the system memory 335 may include an operating system (OS) 337 and an application program 343 of the computer system 112.

The operating system includes but is not limited to a shell 339 and a kernel 341. The shell 339 is an interface between a user and the kernel of the operating system. The shell is an outermost layer of the operating system. The shell manages interaction between the user and the operating system: waiting for an input from the user, interpreting the input from the user to the operating system, and processing various output results of the operating system.

The kernel 341 includes parts of the operating system that are used to manage a memory, a file, a peripheral, and a system resource. When directly interacting with hardware, the kernel of the operating system usually runs a process, provides inter-process communication, and provides functions such as CPU time slice management, interrupt, memory management, and I/O management.

The application program 343 includes programs related to controlling of car driving, such as a program for managing interaction between the car and an obstacle on the road, a program for controlling a route or speed of the car, or a program for controlling interaction between the car and another car on the road. The application program 343 also exists on a system of the deploying server 349. In one embodiment, the computer system 112 may download the application program 343 from the deploying server 349 for executing the application program 343.

For another example, the application program 343 may be an application program that controls the vehicle to determine road structure information based on lane line information of a host lane and boundary information of an adjacent lane (determined based on road edge information and/or detected vehicle trajectory information). The processor 303 in the computer system 112 invokes the application program 343 to obtain a final road structure.

A sensor 353 is associated with the computer system 112. The sensor 353 is configured to detect a surrounding environment of the computer system 112. For example, the sensor 353 may detect an animal, a car, an obstacle, and a pedestrian crosswalk. Further, the sensor may detect surrounding environments of the foregoing objects such as the animal, the car, the obstacle, and the pedestrian crosswalk. For example, the sensor may detect the surrounding environment of the animal, such as another animal that appears around the animal, a weather condition, and brightness of the surrounding environment. Optionally, if the computer system 112 is located on a car, the sensor may be a camera, an infrared sensor, a chemical detector, a microphone, or the like.

Figure 4:
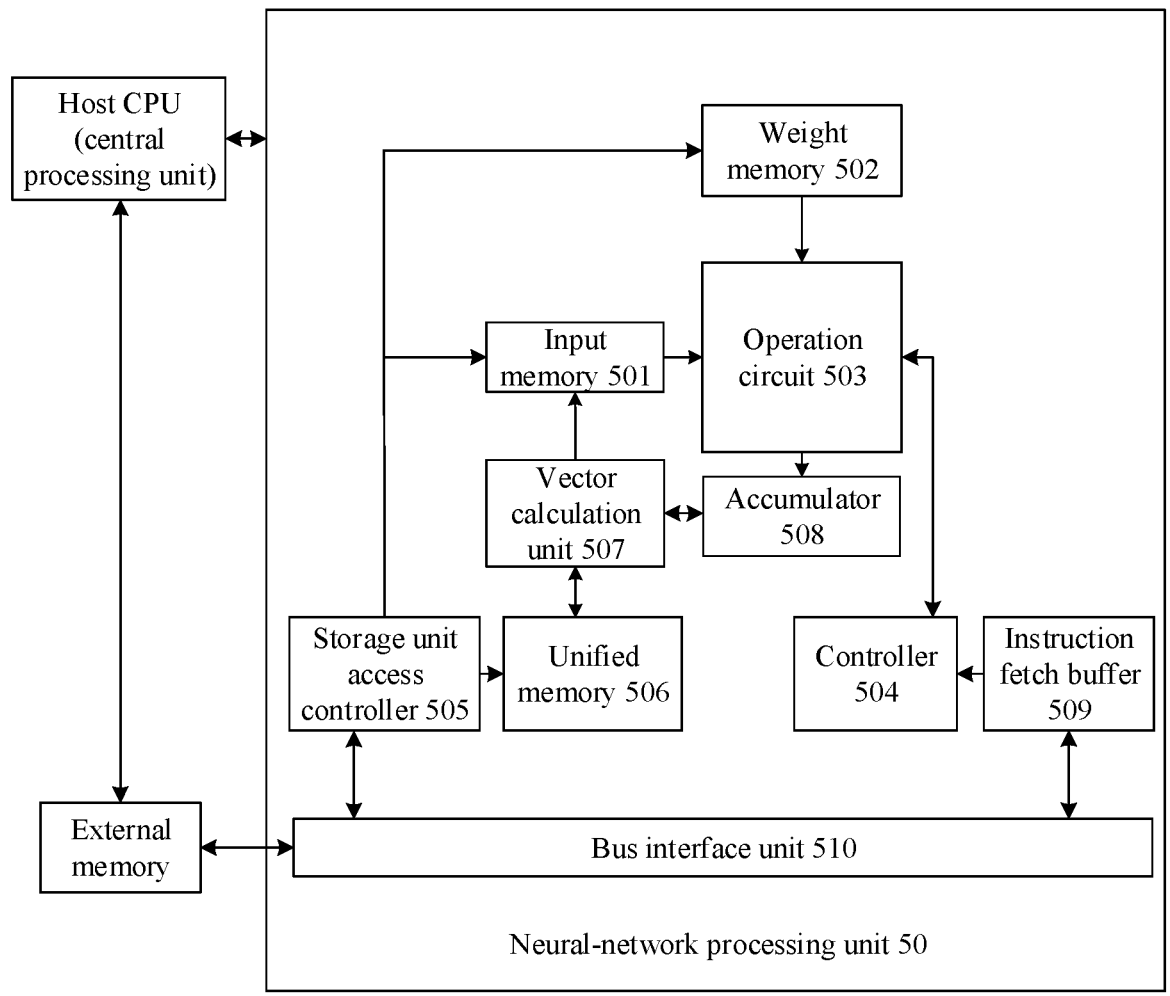
FIG. 4 is a schematic diagram of a structure of a neural-network processor according to an embodiment of this application.

In some other embodiments of this application, the road structure detection method in this embodiment of this application may be further performed by a chip system. The chip system may be located in a vehicle or at another location, for example, located in a server. FIG. 4 is a diagram of an example structure of a chip system according to an embodiment of this application.

A neural-network processing unit (NPU) 50 may be mounted to a host CPU as a coprocessor, and the host CPU allocates tasks to the NPU. A core part of the NPU is an operation circuit 503. For example, a controller 504 controls the operation circuit 503, so that the operation circuit 503 can extract matrix data in a memory and perform a multiplication operation.

In some implementations, the operation circuit 503 includes a plurality of process engines (PE). In some implementations, the operation circuit 503 is a two-dimensional systolic array. The operation circuit 503 may alternatively be a one-dimensional systolic array or another electronic circuit capable of performing mathematical operations such as multiplication and addition. In some implementations, the operation circuit 503 is a general-purpose matrix processor.

For example, it is assumed that there is an input matrix A, a weight matrix B, and an output matrix C. The operation circuit 503 obtains data corresponding to the weight matrix B from a weight memory 502, and buffers the data on each PE in the operation circuit 503. The operation circuit 503 fetches data corresponding to the input matrix A from an input memory 501, performs a matrix operation based on the input matrix A and the weight matrix B to obtain a partial result or a final result of the matrix operation, and stores the result in an accumulator 508.

For another example, the operation circuit 503 may be configured to: implement a feature extraction model (for example, a convolutional neural network model), input image data into the convolutional neural network model, and obtain an image feature by performing an operation using the model. Further, the image feature is output to a classifier, and the classifier outputs a classification probability of an object in an image.

A unified memory 506 is configured to store input data and output data. Weight data in an external memory is directly sent to the weight memory 502 via a storage unit access controller (Direct Memory Access Controller, DMAC) 505. Input data in the external memory may be transferred to the unified memory 506 or to the input memory 501 via the DMAC.

A bus interface unit (BIU) 510 is used for interaction between an advanced extensible interface (AXI) bus and the DMAC and an instruction fetch buffer 509. The bus interface unit 510 is further used by the instruction fetch buffer 509 to obtain instructions from the external memory, and is further used by the storage unit access controller 505 to obtain original data of the input matrix A or the weight matrix B from the external memory.

The DMAC is mainly configured to transfer the input data in the external memory to the unified memory 506, transfer the weight data to the weight memory 502, or transfer the input data to the input memory 501.

A vector calculation unit 507 may include a plurality of operation processing units, and if required, may further process an output of the operation circuit 503, such as vector multiplication, vector addition, exponential operation, logarithm operation, and size comparison. The vector calculation unit 507 is mainly used for calculation at a non-convolutional/FC layer network in a neural network, such as pooling, batch normalization, and local response normalization.

In some implementations, the vector calculation unit 507 stores a processed output vector into the unified memory 506. For example, the vector calculation unit 507 can apply a non-linear function to an output of the operation circuit 503, for example, to a vector of an accumulated value, so as to generate an activated value. In some implementations, the vector calculation unit 507 generates a normalized value, a combined value, or both the normalized value and the combined value. In some implementations, the processed output vector can also be used as an activation input to the operation circuit 503, for example, for use at a subsequent layer in the neural network.

The controller 504 is connected to the instruction fetch buffer 509, and instructions used by the controller 504 may be stored in the instruction fetch memory 509.

In a possible implementation, the unified memory 506, the input memory 501, the weight memory 502, and the instruction fetch memory 509 are all on-chip memories. The external memory is private to a hardware architecture of the NPU.

With reference to FIG. 1 to FIG. 3, the host CPU and the NPU may cooperate to implement a corresponding algorithm of a function required by the vehicle 100 in FIG. 1, or may implement a corresponding algorithm of a function required by the vehicle shown in FIG. 2, or may implement a corresponding algorithm of a function required by the computer system 112 shown in FIG. 3. When the chip system shown in FIG. 4 is located at a location outside the vehicle, for example, located in the server. The host CPU and the NPU cooperate to implement a corresponding algorithm of a function required by the server.

Figure 5:
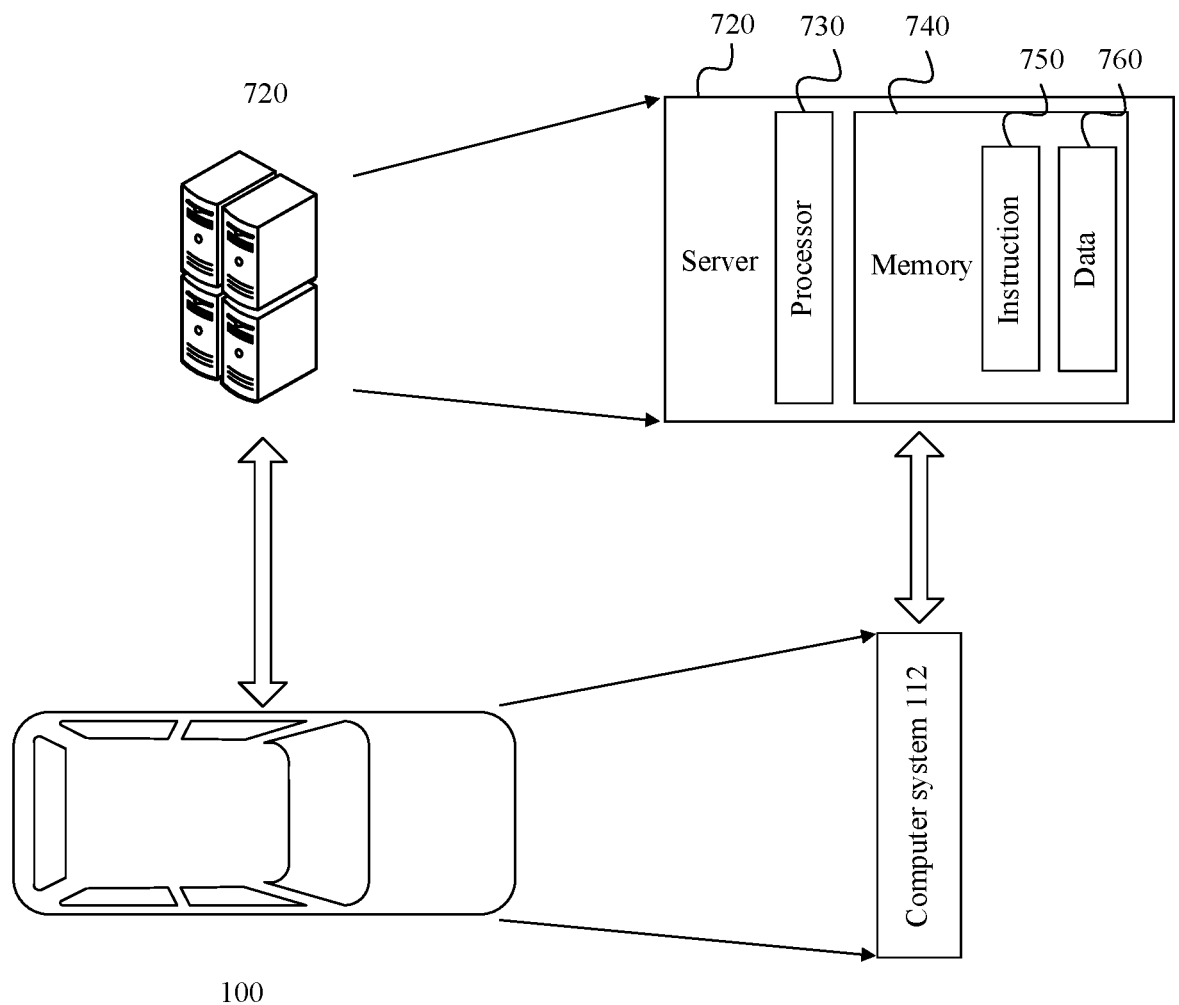
FIG. 5 is a schematic diagram of application of an autonomous driving vehicle with cloud-side instructions according to an embodiment of this application.

In some other embodiments of this application, the computer system 112 may further receive information from or transfer information to another computer system. Alternatively, sensor data collected from the sensor system 104 of the vehicle 100 may be transferred to another computer, and the another computer processes the data. As shown in FIG. 5, data from the computer system 112 may be transferred via a network to a cloud-side computer system 720 for further processing. The network and intermediate nodes may include various configurations and protocols, including the Internet, the World Wide Web, an intranet, a virtual private network, a wide area network, a local area network, private networks of proprietary communication protocols for use of one or more companies, the Ethernet, Wi-Fi, a hypertext transfer protocol (HTTP), and various combinations of the foregoing. Such communication may be performed by any device capable of transmitting data to and from another computer, such as a modem and a wireless interface.

In one example, the computer system 720 may include a server having a plurality of computers, for example, a group of load balancing servers. The computer system 720 exchanges information with different nodes in the network to receive, process, and transmit data from the computer system 112. The server 720 may have a configuration similar to that of the computer system 112 and include a processor 730, a memory 740, instructions 750, and data 760.

In one example, the data 760 in the server 720 may include information related to weather. For example, the server 720 may receive, monitor, store, update, and transmit various pieces of weather-related information. The information may include, for example, rainfall, cloud, and/or temperature information and/or humidity information in a form of a report, radar information, a forecast, or the like.

Figure 6:
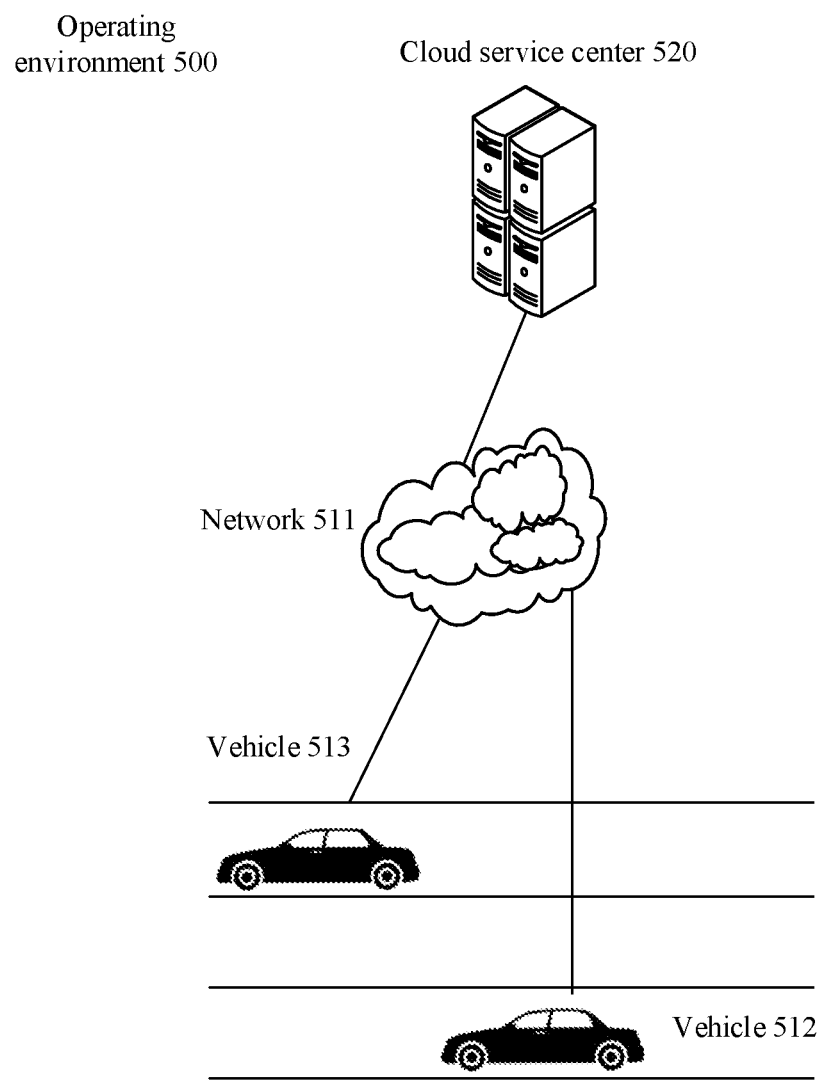
FIG. 6 is a schematic diagram of application of an autonomous driving vehicle with cloud-side instructions according to an embodiment of this application.

FIG. 6 illustrates an example of interaction between a vehicle and a cloud service center (cloud server). The cloud service center may receive information (such as data collected by a vehicle-mounted sensor or other information) from vehicles 513 and 512 in an operating environment 500 of the cloud service center via a network 511 such as a wireless communications network.

The cloud service center 520 runs, based on the received data, a stored program related to controlling of car driving to control the vehicles 513 and 512. The program related to controlling of car driving may be a program for managing interaction between the car and an obstacle on the road, a program for controlling a route or speed of the car, or a program for controlling interaction between the car and another car on the road.

For example, the cloud service center 520 may provide a part of a map to the vehicles 513 and 512 via the network 511. In another example, operations may be divided between different locations. For example, a plurality of cloud service centers may receive, acknowledge, combine, and/or send information reports. In some examples, information reports and/or sensor data may also be sent between vehicles. Another configuration is also possible.

In some examples, the cloud service center 520 sends a proposed solution (for example, informs the vehicle that there is an obstacle ahead and how to circumvent the obstacle) to the vehicle regarding possible driving conditions in the environment. For example, the cloud service center 520 may assist the vehicle in determining how to travel when there is a specific obstacle ahead in the environment. The cloud service center 520 sends a response to the vehicle indicating how the vehicle should travel in a given scene. For example, the cloud service center 520 may confirm existence of a temporary stop sign in front of the road based on collected sensor data, or for example, determine that the lane is closed due to construction based on a "lane closed" sign and sensor data of a construction vehicle. Correspondingly, the cloud service center 520 sends a suggested operation mode (for example, indicating the vehicle to change lanes onto another road) for the vehicle to pass the obstacle. When the cloud service center 520 observes a video stream in the operating environment 500 of the cloud service center 520 and has confirmed that the vehicle can safely and successfully pass the obstacle, operating steps used for the vehicle may be added to a driving information map. Correspondingly, this information may be sent to another vehicle that may encounter a same obstacle in the region, to assist the another vehicle not only in recognizing the closed lane but also in knowing how to pass.

Figure 7:
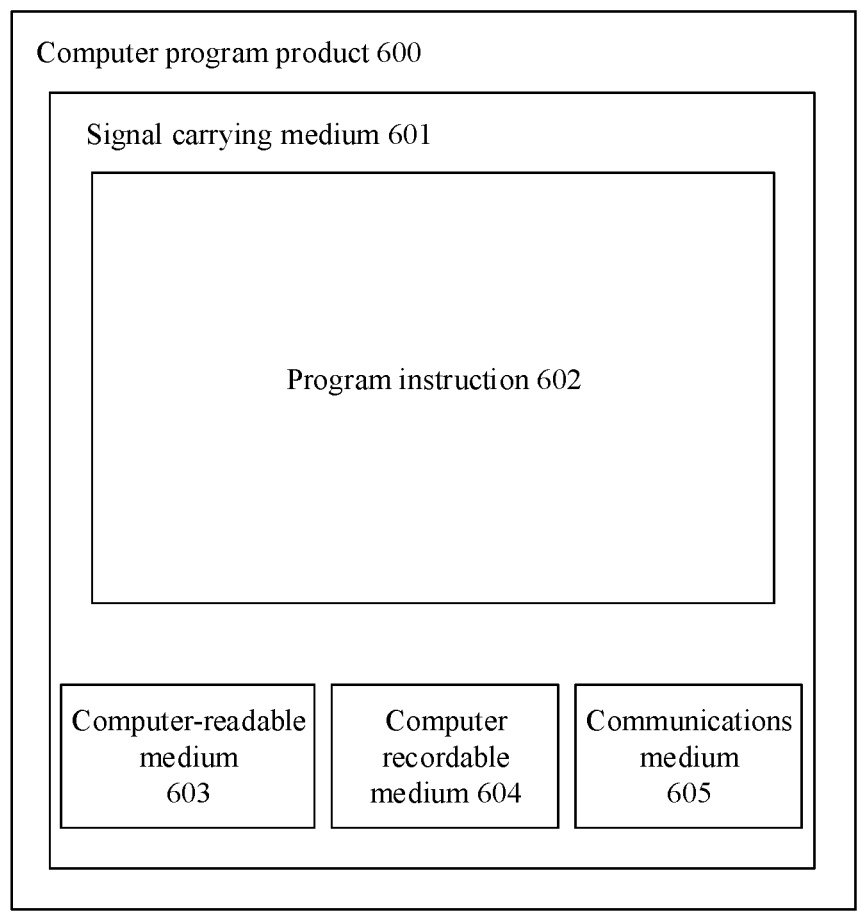
FIG. 7 is a schematic diagram of a structure of a computer program product according to an embodiment of this application.

In some embodiments, the disclosed method may be implemented as a computer program instruction encoded on a computer-readable storage medium or encoded on another non-transitory medium or article in a machine readable format. FIG. 7 schematically shows a conceptual partial view of an example computer program product arranged according to at least some embodiments shown herein, and the example computer program product includes a computer program for executing a computer process on a computing device. In an embodiment, an example computer program product 600 is provided by using a signal carrying medium 601. The signal carrying medium 601 may include one or more program instructions 602. When being run by one or more processors, the one or more program instructions 602 may provide all or some of the functions described above for FIG. 1 to FIG. 6, or may provide all or some of functions described in subsequent embodiments. For example, referring to an embodiment shown in FIG. 9, one or more features in S901 to S903 may be carried by one or more instructions associated with the signal carrying medium 601. In addition, the program instructions 602 in FIG. 7 also describe example instructions.

In some embodiments, when the technical solutions in embodiments of this application are executed by a vehicle or a component in the vehicle, the computer program product may be a program product used by the vehicle or the component of the vehicle. When the technical solutions in embodiments of this application are executed by another apparatus other than a vehicle, for example, a server, the computer program product may be a program product used by the another apparatus.

In some examples, the signal carrying medium 601 may include a computer-readable medium 603, which may be but is not limited to a hard disk drive, a compact disc (CD), a digital video disc (DVD), a digital tape, a memory, a read-only memory (ROM), a random access memory (RAM), or the like. In some implementations, the signal carrying medium 601 may include a computer-recordable medium 604, for example, including but not limited to a memory, a read/write (R/W) CD, or an R/W DVD. In some implementations, the signal carrying medium 601 may include a communications medium 605, for example, including but not limited to a digital and/or analog communications medium (for example, an optical cable, a waveguide, a wired communication link, or a wireless communication link). Therefore, for example, the signal carrying medium 601 may be transferred by the communications medium 605 in a wireless form (for example, a wireless communications medium in accordance with the institute of electrical and electronics engineers (IEEE)) 802.11 standard or another transmission protocol. The one or more program instructions 602 may be, for example, one or more computer-executable instructions or logic implementation instructions. In some examples, a computing device described for FIG. 1 to FIG. 6 may be configured to provide various operations, functions, or actions in response to the program instruction 602 that is communicated to the computing device by using one or more of the computer-readable medium 603, and/or the computer-recordable medium 604, and/or the communications medium 605. It should be understood that the arrangement described herein is merely for purpose of an example. Thus, it should be understood by a person skilled in the art that another arrangement and another element (for example, a machine, an interface, a function, a sequence, a function group, or the like) can be used instead, and that some elements may be omitted together according to a desired result. In addition, many of the described elements are functional entities that can be implemented as discrete or distributed components, or implemented in any suitable combination and at any suitable location in combination with another component.

Figure 8A:
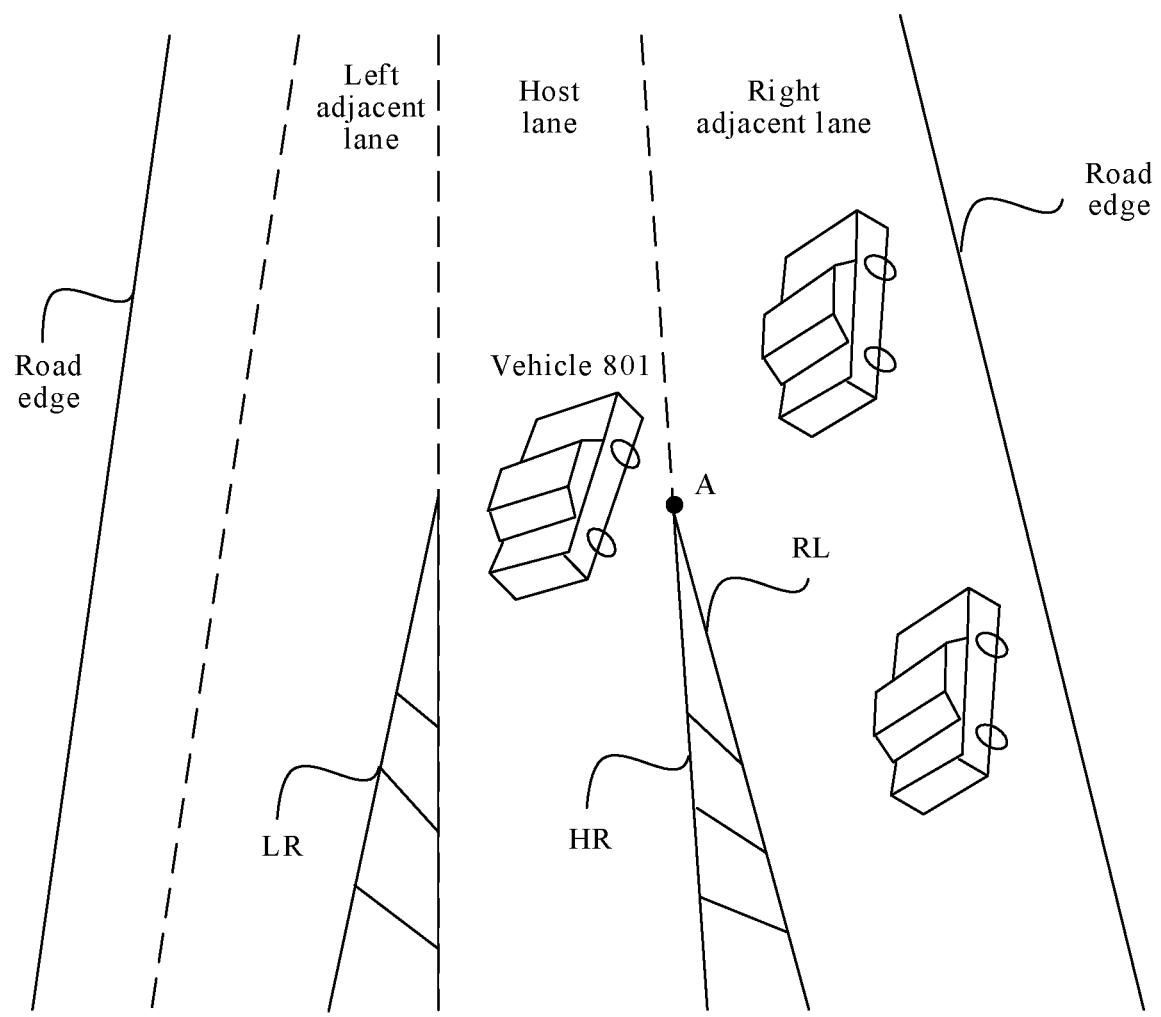
FIG. 8(*a*) and FIG. 8(*b*) are schematic diagrams of scenarios of a road structure detection method according to an embodiment of this application.
Figure 8B:
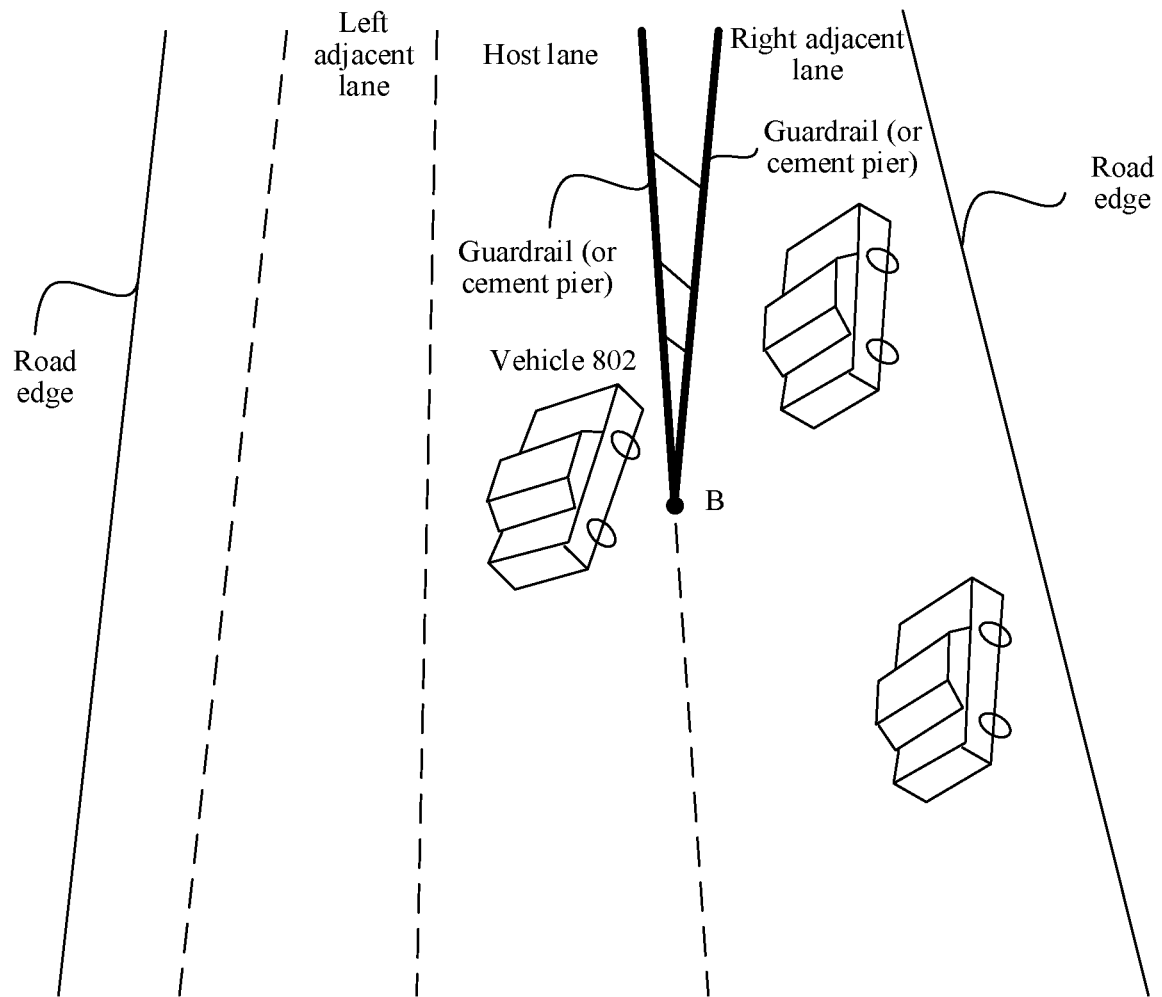

The road structure detection method provided in embodiments of this application is applied to an autonomous/semi-autonomous driving scenario or another driving scenario. Specifically, the method is applied to a scenario in which road structure information is determined. The road structure information includes location information of a merge point of a host lane and an adjacent lane and/or a split point of the host lane and the adjacent lane. For example, the method is applied to a scenario shown in FIG. 8(a) or a scenario shown in FIG. 8(b). As shown in FIG. 8(a), there is a merge point A between a host lane in which a vehicle 801 is located and an adjacent lane (namely, a lane close to the host lane). In other words, there is the merge point A between the host lane and a right adjacent lane. A location of the merge point A is a location of intersection of a right lane line of the host lane (host right lane line, HR) and a left lane line of the right adjacent lane (right left lane line, RL). In this embodiment of this application, unless otherwise specified, the lane line generally refers to a planar pattern drawn on a road surface by using paint (for example, paint). As shown in FIG. 8(b), there is a split point B between the host lane in which the vehicle 802 is located and the right adjacent lane. A location of the split point B is related to locations of raised objects such as guardrails (or cement piers) on a boundary side of the host lane and raised objects such as guardrails (or cement piers) on a boundary side of the adjacent lane. For example, when two lanes are separated by guardrails, the location of the split point B is a location of intersection of the two guardrails. When two lanes are separated by cement piers, the split point B is a location of intersection of the two cement piers. A difference between the scenario in FIG. 8(a) and the scenario in FIG. 8(b) lies in a factor that determines the location of the merge point or the split point. In one case, the location of the merge point or the split point is determined based on the location of intersection of the lane lines on the plane. In the other case, the location of the merge point or the split point is determined based on the location of the raised objects on the road.

The following describes in detail the road structure detection method in embodiments of this application with reference to the accompanying drawings.

Figure 9:
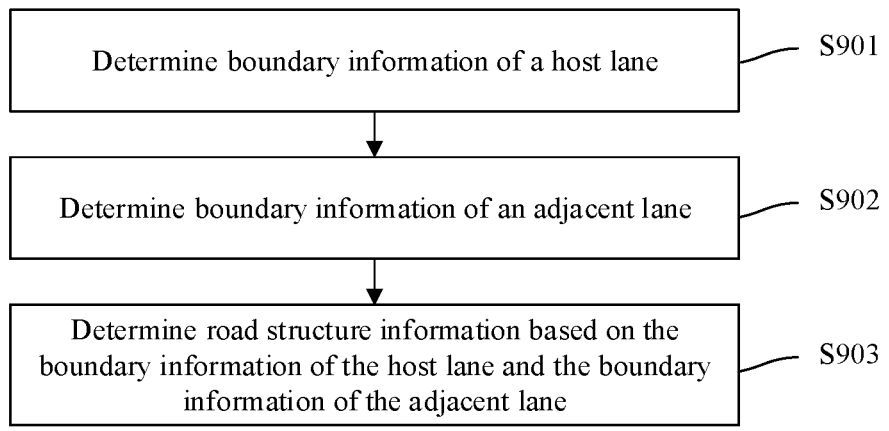
FIG. 9 is a schematic flowchart of a road structure detection method according to an embodiment of this application.

An embodiment of this application provides a road structure detection method. The method may be applied to the apparatuses in FIG. 1 to FIG. 6, the computer program product shown in FIG. 7, or another apparatus far from a vehicle. In descriptions of the technical solution below, an execution body of the technical solution is omitted. Referring to FIG. 9, the method includes the following steps:

S901: Determine boundary information of a host lane.

The boundary information of the host lane is used to represent a location of a boundary of the host lane (that is, the current lane). The boundary information of the host lane includes lane line information of the host lane and/or location information of the boundary of the host lane. In a possible implementation, raised objects may be used to separate lane boundaries between lanes. The location information of the boundary of the host lane includes but is not limited to location information of a raised object on a boundary side of the host lane. The raised object on the boundary side of the host lane includes but is not limited to a guardrail or a cement pier on the boundary side of the host lane.

In a possible implementation, a visual sensor (for example, a camera) may be used to collect visual information of a lane line, to determine a location of the lane line. A location of a lane boundary may be obtained by using a radar or a similar component.

S902: Determine boundary information of an adjacent lane.

The boundary information of the adjacent lane is used to represent a location of a boundary of the adjacent lane. The boundary information of the adjacent lane includes lane line information of the adjacent lane and/or location information of a boundary of the adjacent lane. When boundaries between lanes are separated by using raised objects, the location information of the boundary of the adjacent lane may refer to location information of a raised object on a boundary side of the adjacent lane. The raised object includes but is not limited to a guardrail or a cement pier on the boundary side of the adjacent lane.

In a possible implementation, the boundary information of the adjacent lane is determined based on detected vehicle trajectory information and/or road edge information, and road prior data. In other words, the boundary information of the adjacent lane is determined based on the road prior data and the detected vehicle trajectory information. Alternatively, the boundary information of the adjacent lane is determined based on the road prior data and the road edge information. Alternatively, the boundary information of the adjacent lane is determined based on the road prior data, the detected vehicle trajectory information, and the road edge information.

The road edge information is used to represent a location of a road edge.

Herein, several manners of determining the vehicle trajectory information and the road edge information are described by way of example. A visual sensor of the vehicle, for example, a camera, may be used to collect visual information of a vehicle in an adjacent lane to determine the detected vehicle trajectory information. A radar of the vehicle or a component having a similar function may be further used to determine information such as a location and a speed of a vehicle in another lane by using a transmit and receive laser, a millimeter wave, or the like, to determine vehicle trajectory information of the another lane. Certainly, the vehicle trajectory information of the another lane may alternatively be determined in another manner. This is not limited in this embodiment of this application. When a road edge line is marked by a planar pattern made of paint, a component such as the camera may be used to collect visual information of the road edge line, so as to determine a location of the road edge, namely, the road edge information. When a raised object (which may be a guardrail, a cement pier, or the like) is used to mark the road edge, the camera may also be used to determine the road edge information. The road edge information may alternatively be determined by using a component such as the radar. A manner of determining the road edge information is not limited in this embodiment of this application.

In this embodiment of this application, the road prior data includes a lane width. Lane widths may be different in different scenarios. For example, a width of each lane for urban roads is 3.5 meters, a width of each lane for crossroads is 2.3 to 2.5 meters, and a width of each lane for trunk roads (including highways) is 3.75 meters. In other words, in this embodiment of this application, a lane width used for determining the boundary information of the adjacent lane is related to a current scenario in which the vehicle is located. A sensor, for example, a camera of an ego vehicle may be used to collect a lane width in the current scenario. The ego vehicle may alternatively directly obtain the lane width in the current scenario from another device (for example, a server) in a network. A manner of obtaining the lane width is not limited in this embodiment of this application.

A manner of determining the boundary information of the adjacent lane is specifically described below. The following separately describes two cases classified according to whether a merge point or a split point is formed by lane lines or by raised objects.

Case 1: When a merge point or a split point is formed by lane lines marked with paint, if the adjacent lane is a right adjacent lane, the boundary information of the adjacent lane includes location information of an RL; if the adjacent lane is a left adjacent lane, the boundary information of the adjacent lane includes location information of a right lane line of the left adjacent lane (left right lane line, LR). An example of the LR is shown in FIG. 8(a). It should be noted that, in FIG. 8(a), both the RL and the LR are marked. However, in an actual application scenario, the LR and the RL may not exist on the road at the same time in some cases. In other words, in an actual scenario, only the RL or only the LR may exist. It may be understood that, this embodiment of this application is merely an example. A person skilled in the art may apply this method to detect other road edge information, for example, a merge point and a split point between other lanes that are not adjacent to the host lane, to provide sufficient road information for a decision execution module to predict a travel path.

In a possible implementation of case 1, the RL and/or the LR are/is determined based on the road edge information and the road prior data. Specifically, the road edge is translated to the left by a first width to obtain a first location of the RL; and the road edge is translated to the right by a third width to obtain a fourth location of the LR.

The first width is an integer multiple of the lane width, and the third width is an integer multiple of the lane width.

Figure 10A:
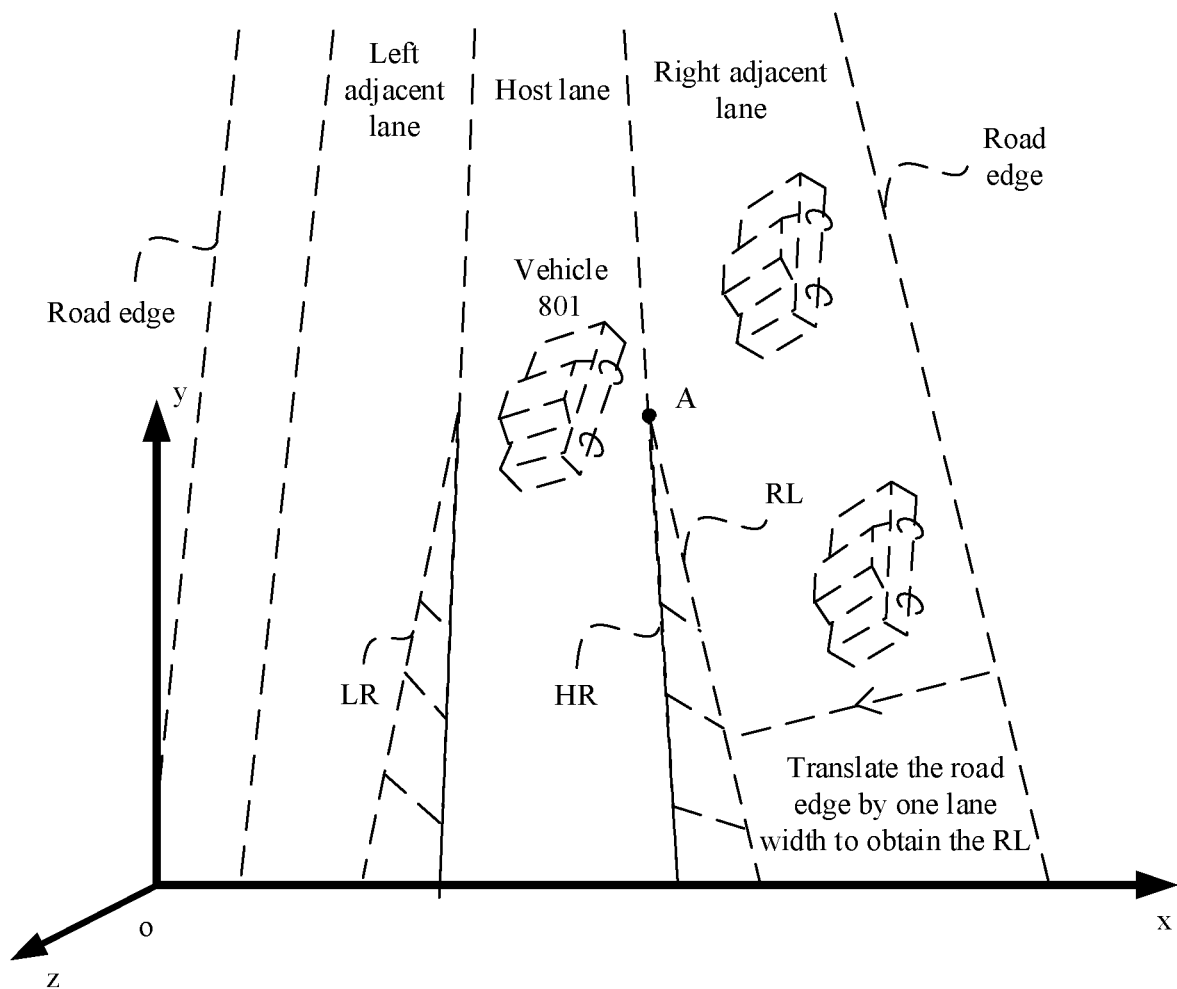
FIGS. 10(*a*)-10(*d*) and FIGS. 11(*a*)-11(*b*) are schematic diagrams of scenarios of a road structure detection method according to an embodiment of this application.

Usually, the road edge information may be described by using a cubic equation (because the road surface is usually a plane, a quadratic equation or another possible equation may alternatively be used). The road edge information (points constituting the road edge) is mapped to a world coordinate system, and a series of operations is performed on these points in the world coordinate system to obtain a location of the RL or the LR. Determining of the location of the RL is used as an example. Referring to FIG. 10(a), after the points on the road edge are mapped to the world coordinate system, all the points on the road edge are translated to the left (that is, translated to a side close to an origin point o). Because the vehicle does not know a quantity of lanes between the road edge and the host lane in advance, a translation operation is performed first on a basis of a minimum granularity, that is, translation is performed by one lane width to obtain a preliminarily determined RL. The preliminarily determined RL is used to subsequently determine a location of a preliminarily determined merge point or split point. When the location of the preliminarily determined merge point or split point meets a preset condition, the preliminarily determined RL does not need to be adjusted. On the contrary, when the location of the preliminarily determined merge point or split point does not meet the preset condition, the preliminarily determined RL further needs to be adjusted until a final location of the merge point or the split point meets the preset condition. Herein, a manner of preliminarily determining the RL is first described, and a specific method for determining whether the location of the merge point or the split point meets the preset condition and a specific method for adjusting the RL are described in detail below.

For a manner of determining the LR, refer to the manner of determining the RL, and details are not described herein again.

In some other embodiments, the road edge information may alternatively be mapped to an image plane (or referred to as an image coordinate system), and a series of operations such as translation is performed on the points on the road edge on the image plane to determine the location of the RL or the LR.

Certainly, a type of the coordinate system to which mapping is performed is not limited in this embodiment of this application.

In another possible implementation of case 1, the RL and/or the LR are/is determined based on the detected vehicle trajectory information and the road prior data. Specifically, the vehicle trajectory is translated to the left by a second width to obtain a second location of the RL, and the vehicle trajectory is translated to the right by a fourth width to obtain a fifth location of the LR.

The second width is an odd multiple of a half-lane width, and the fourth width is an odd multiple of the half-lane width.

Figure 10B:
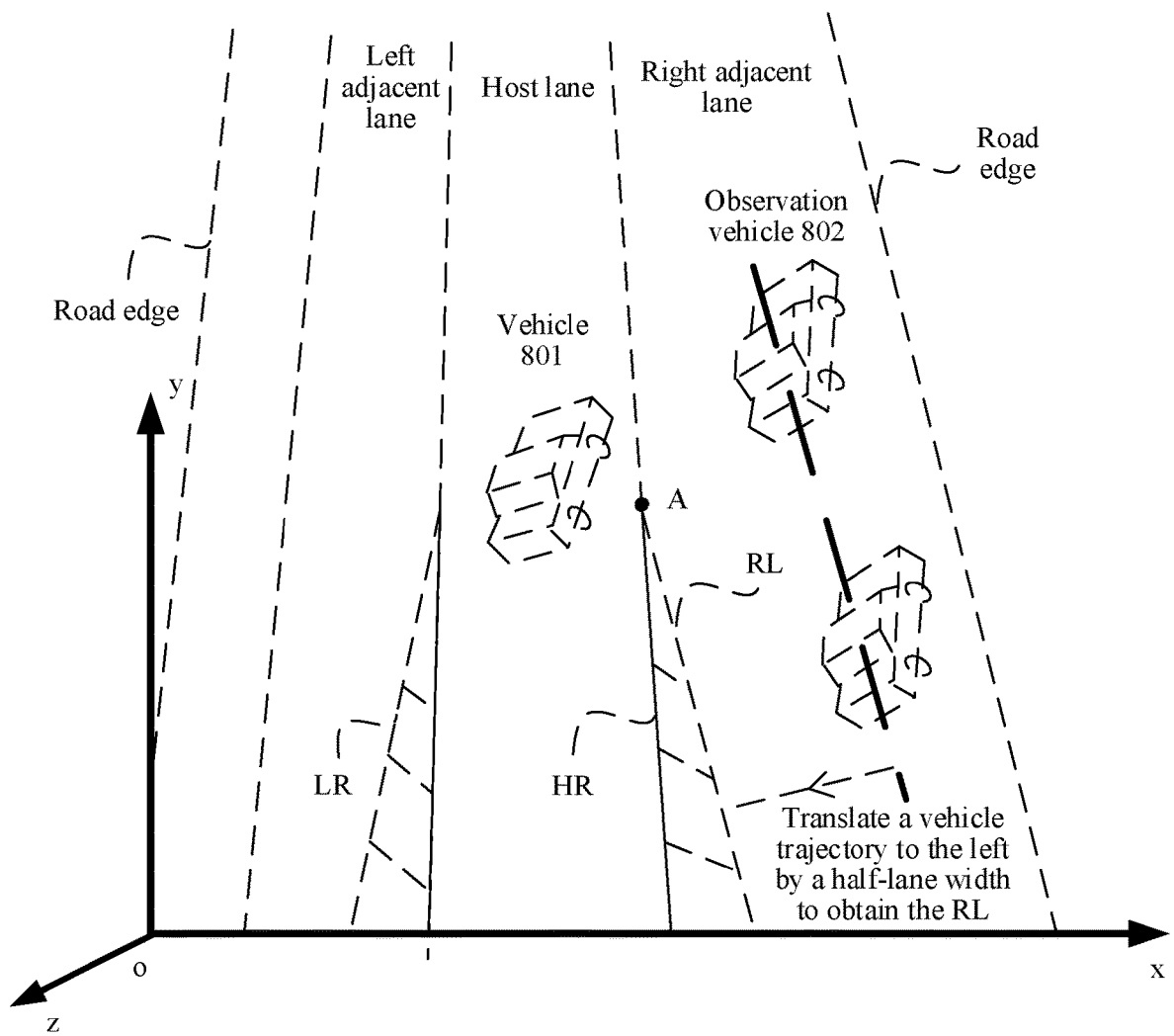

Herein, the detected vehicle trajectory information may be described by using a cubic equation (because the road is usually a plane, a quadratic equation or another possible equation may alternatively be used). The vehicle trajectory information (points constituting the vehicle trajectory) may be mapped to the world coordinate system, and a series of operations such as translation is performed on these points in the world coordinate system to obtain the location of the RL or the LR. Determining of the location of the RL is used as an example. Referring to FIG. 10(b), after mapping the points on the vehicle trajectory to the world coordinate system, the RL is obtained by translating all the points on the vehicle trajectory to the left by the half-lane width. For a manner of determining the LR, refer to the manner of determining the RL, and details are not described herein again.

It should be noted that, in this embodiment of this application, an example in which an observation vehicle is located at the center of the lane is used to set the second width or the fourth width. Because the observation vehicle may not actually be located at the center of the lane, an actual width of the second width or the fourth width may be adjusted to another width.

In some other embodiments, the vehicle trajectory information may alternatively be mapped to an image plane, and a series of operations such as translation is performed on the points on the vehicle trajectory on the image plane to determine the location of the RL or the LR.

In still another possible implementation of case 1, the RL and/or the LR are/is determined based on the road edge information, the detected vehicle trajectory information, and the road prior data. Specifically, the first location and the second location are fused by using a preset algorithm to obtain a third location of the RL, and the fourth location and the fifth location are fused by using the preset algorithm to obtain a sixth location of the LR.

Determining of the RL is used as an example. It is easy to understand that, in the above two cases, there may be a deviation between the RL determined based on the road edge information and the road prior data and the RL determined based on a vehicle trajectory on the adjacent lane and the road prior data. For example, because a detection distance of the radar is relatively small, a detected short-distance vehicle trajectory is relatively accurate, and the resulting RL location is more accurate; while a detected long-distance road edge information is not quite accurate, and the resulting RL location may not be quite accurate. In this case, the two pieces of RL location information may be fused to improve accuracy of the determined RL location. A used fusion algorithm may be, but is not limited to, weighted summation. A weight of the first location of the RL determined based on the road edge information and a weight of the second location of the RL determined based on the vehicle trajectory information may be set according to an actual scenario. For example, when the detection distance of the radar is relatively small or the detection distance is small due to hazy weather, the second location may be closer to an actual location of the RL, and the weight of the second location is set to be larger than the weight of the first location. In this case, because the weight can be determined in real time based on an actual scenario, performance of the vehicle, or other factors, accuracy of the location information obtained by fusion can be improved. Certainly, the weights of the first location and the second location may alternatively be set in advance. For example, the weights of the first location and the second location are set in advance based on some historical data or other data. A manner of presetting the weights is simple to implement without adjusting the weights of the first location and the second location according to an actual scenario.

Case 2: When a merge point or a split point is formed by raised objects, if the adjacent lane is a right adjacent lane, the boundary information of the adjacent lane includes location information of a left boundary of the right adjacent lane; and if the adjacent lane is a left adjacent lane, the boundary information of the adjacent lane includes location information of a right boundary of the left adjacent lane.

In a possible implementation of case 2, a location of the left boundary of the right adjacent lane and/or a location of the right boundary of the left adjacent lane is determined based on the road edge information and the road prior data. Specifically, the road edge is translated to the left by a fifth width to obtain a seventh location of the left boundary of the right adjacent lane; and the road edge is translated to the right by a seventh width to obtain a tenth location of the right boundary of the left adjacent lane.

The fifth width is an integer multiple of the lane width, and the seventh width is an integer multiple of the lane width.

Figure 10C:
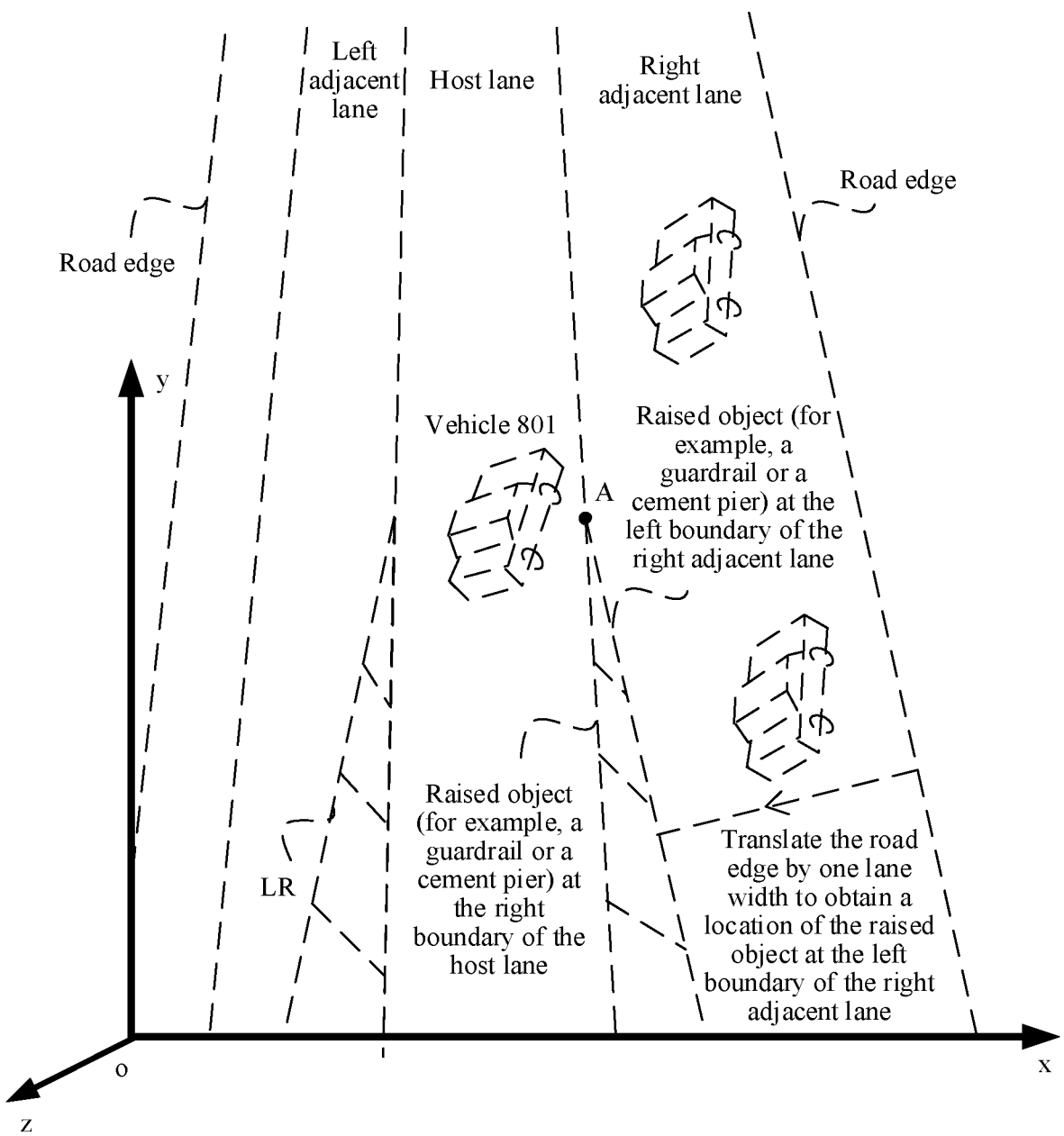

Determining of the location of the left boundary of the right adjacent lane is used as an example. Referring to FIG. 10(c), after points on the road edge are mapped to the world coordinate system, the location of the left boundary of the right adjacent lane can be obtained by translating all the points on the road edge to the left by one lane width. For a manner of determining the location of the right boundary of the left adjacent lane, refer to the manner of determining the location of the left boundary of the right adjacent lane. Details are not described herein again.

In another possible implementation of case 2, the location of the left boundary of the right adjacent lane and/or the location of the right boundary of the left adjacent lane are/is determined based on the detected vehicle trajectory information and the road prior data. Specifically, the vehicle trajectory is translated to the left by a sixth width to obtain an eighth location of the left boundary of the right adjacent lane; and the vehicle trajectory is translated to the right by an eighth width to obtain an eleventh location of the right boundary of the left adjacent lane.

The sixth width is an odd multiple of a half-lane width, and the eighth width is an odd multiple of the half-lane width.

Figure 10D:
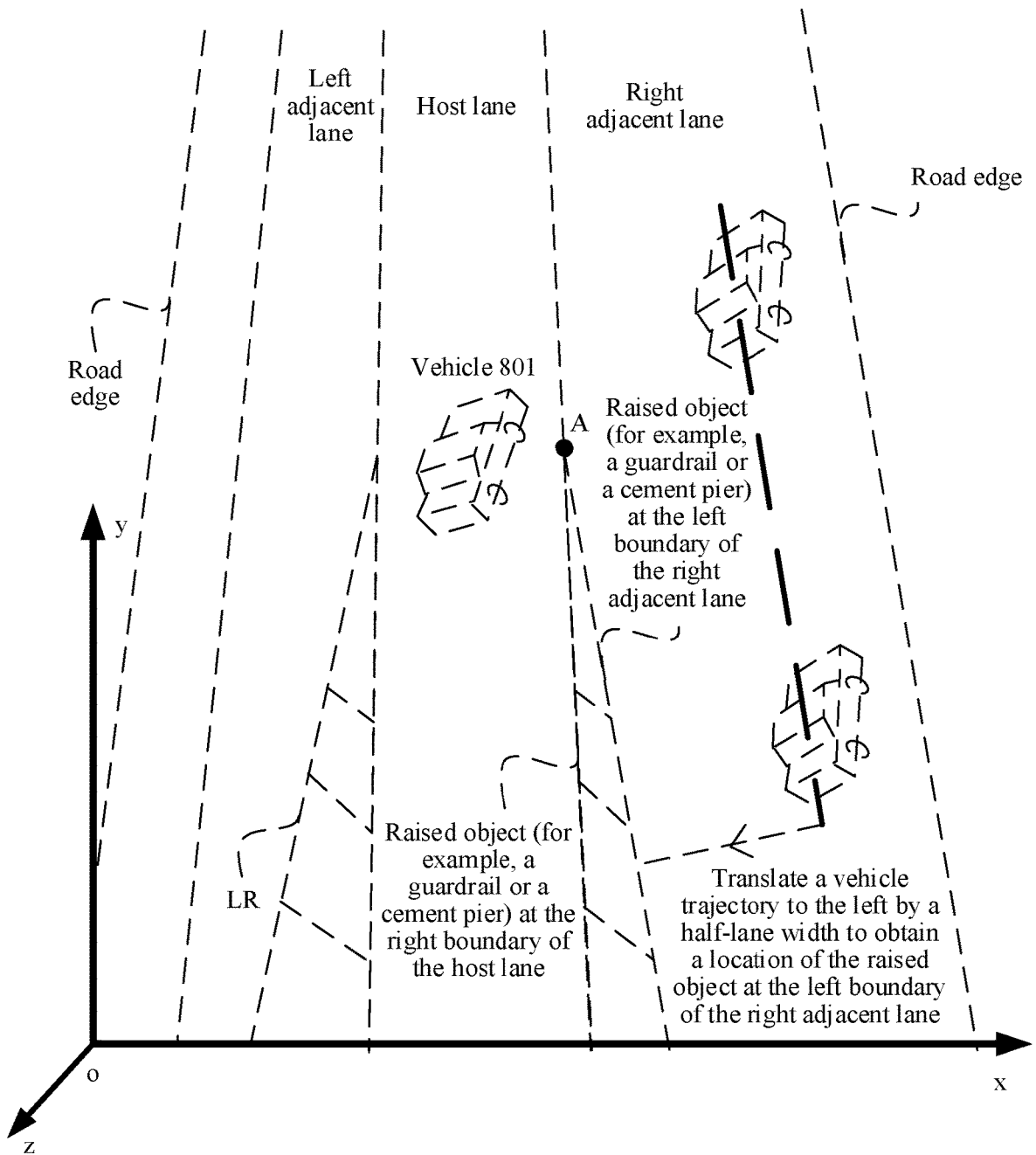

Determining of a location of a raised object (for example, a guardrail) at the left boundary of the right adjacent lane is used as an example. Referring to FIG. 10(d), after the points on the vehicle trajectory are mapped to the world coordinate system, the location of the raised object at the left boundary of the right adjacent lane can be obtained by translating all the points on the vehicle trajectory to the left by the half-lane width. For a manner of determining a location of a raised object at the right boundary of the left adjacent lane, refer to the manner of determining the location of the raised object at the left boundary of the right adjacent lane. Details are not described herein again.

In some other embodiments, the vehicle trajectory information may alternatively be mapped to an image plane to determine the location of the left boundary of the right adjacent lane or the location of the right boundary of the left adjacent lane.

In still another possible implementation of case 2, the location of the left boundary of the right adjacent lane and/or the location of the right boundary of the left adjacent lane are/is determined based on the road edge information, the detected vehicle trajectory information, and the road prior data. Specifically, a first location and a second location of the left boundary of the right adjacent lane are fused by using a preset algorithm to obtain a third location of the left boundary of the right adjacent lane; and a fourth location and a fifth location of the right boundary of the left adjacent lane are fused by using the preset algorithm to obtain a sixth location of the right boundary of the left adjacent lane.

For a specific manner of obtaining the third location based on the first location and the second location of the left boundary of the right adjacent lane, and the fusion algorithm, refer to the foregoing process of obtaining the third location based on the first location and the second location of the RL, and the fusion algorithm. Details are not described herein again.

It should be noted that, the lane mentioned in this embodiment of this application refers not only to a common lane, but also to a road structure such as an emergency stop area. When an emergency stop area occurs on a road surface, because a width of the emergency stop area is close to that of the common lane, processing may be performed based on the width of the common lane. Alternatively, the foregoing translation operation may be performed by using an actual width of the emergency stop area, to determine the boundary information of the adjacent lane.

It can be learned that, in this embodiment of this application, the boundary information of the adjacent lane is inferred based on the road edge information and/or the detected vehicle trajectory information, rather than through direct detection by the camera. In this way, the following problem can be avoided to some extent: When a lane line location of the adjacent lane is directly collected by the camera, the lane line location of the adjacent lane cannot be collected or the collected lane line location of the adjacent lane is inaccurate due to poor detection performance (for example, a relatively small detection distance) of the camera or an environmental factor (for example, haze).

S903: Determine road structure information based on the boundary information of the host lane and the boundary information of the adjacent lane.

When a merge point or a split point is formed by lane lines marked with paint, specific implementation of S903 is: determining location information of the merge point or the split point based on the lane line information of the host lane (HR) and the lane line information of the adjacent lane. For example, a merge point exists between the host lane and the right adjacent lane. Referring to FIG. 10(a) or FIG. 10(b), after the locations of the HR and the RL are determined, an intersection location of the HR and the RL is a location of the merge point A.

When a merge point or a split point is formed by raised objects, specific implementation of S903 is: determining location information of the merge point or the split point based on information about the raised object on the boundary side of the host lane and information about the raised object on the boundary side of the adjacent lane. For example, a merge point exists between the host lane and the right adjacent lane. Referring to FIG. 10(c) or FIG. 10(d), after locations of the guardrail (or a cement pier or the like) at the right boundary of the host lane and the guardrail (or a cement pier or the like) at the left boundary of the right adjacent lane are determined, an intersection location of the two guardrails (or cement piers) is a location of the merge point A.

In this embodiment of this application, after the location of the merge point or the split point is preliminarily determined, it further needs to determine whether the location of the preliminarily determined merge point (or split point) meets a preset condition. Specifically, determining of whether the location of the preliminarily determined merge point meets the preset condition is used as an example. The preset condition may be as follows: A distance between the preliminarily determined merge point (for example, the merge point A determined in FIG. 10(a) to FIG. 10(d)) and a reference point is less than or equal to a first threshold. The reference point is a location reference and is used to determine whether the location of the preliminarily determined merge point (or split point) is accurate. When the distance between the location of the preliminarily determined merge point (or split point) and the reference point is less than the first threshold, it may be considered that the location of the preliminarily determined merge point (or split point) is accurate. For example, the reference point may be a current vehicle (for example, the vehicle 801 in FIG. 8(a)). The first threshold is determined by using a sensing range of a sensor, or the first threshold is a pre-configured value.

In this embodiment of this application, when a distance between the preliminarily determined merge point and the vehicle is less than or equal to the first threshold, for example, a distance between the location of the preliminarily determined merge point A in FIG. 10(a) to FIG. 10(d), and the vehicle is less than or equal to the first threshold, it is considered that the location of the preliminarily determined merge point is accurate and requires no further adjustment. Similarly, in a scenario in which a split point appears on the road, it is also required that a distance between the split point and the vehicle is less than or equal to the first threshold. When a distance between the preliminarily determined split point and the vehicle is less than or equal to the first threshold, it is considered that the location of the preliminarily determined split point is accurate and requires no further adjustment.

On the contrary, when the distance between the preliminarily determined merge point and the vehicle is greater than the first threshold, the width adjusted when the boundary information of the adjacent lane is determined may be inaccurate. In this case, at least one of the above widths needs to be adjusted. Specifically, the at least one of the widths is adjusted based on the first threshold, and the merge point and/or the split point are/is adjusted based on the adjusted at least one width.

Figure 11A:
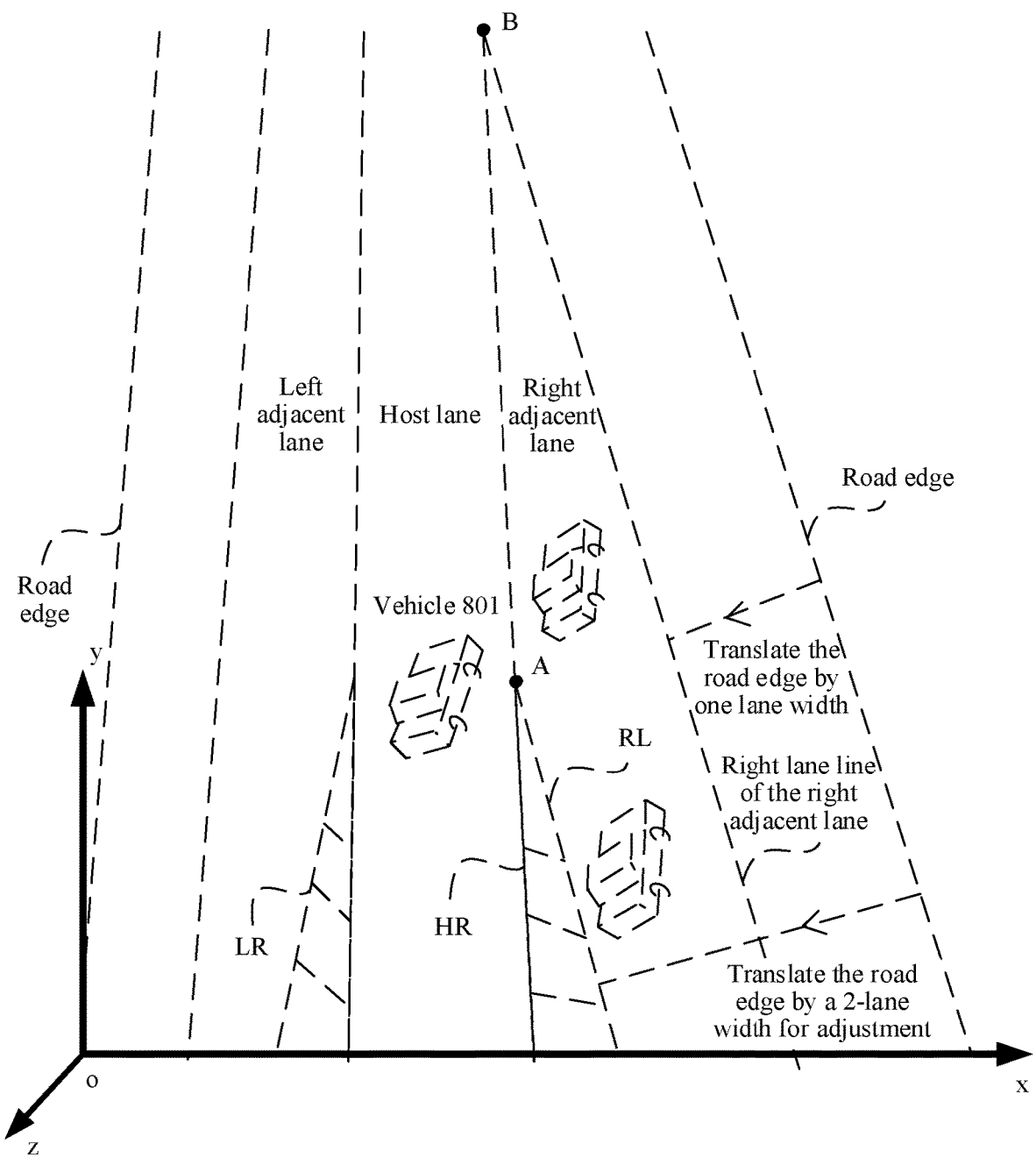

For example, referring to FIG. 11(a), when there are a plurality of lanes (two lanes are shown in FIG. 11(a)) between the host lane in which the vehicle 801 is located and the road edge, the points on the road edge are translated to the left by one lane width. Thus, a right lane line of the right adjacent lane is actually obtained, and is considered as the preliminarily determined RL. In this way, the location of the merge point, for example, a location of the point B shown in FIG. 11(a), is preliminarily determined based on the preliminarily determined RL (actually the right lane line of the right adjacent lane) and a right lane line of the host lane. A distance between the location of the preliminarily determined point B and the vehicle is relatively large, and the point B is not an actual merge point, as shown in FIG. 11(a). Therefore, the translation width of one lane width needs to be adjusted by a specific step, where the step may be one lane width. Herein, the translation width needs to be adjusted from a one-lane width to a two-lane width. In other words, the points on the road edge are translated to the left by the two-lane width, that is, translated to the left by another one lane width after the first translation to the left by one lane width, to obtain an adjusted RL. As shown in FIG. 11(a), an actual RL may be obtained after this adjustment. If a location of an intersection of the RL and the HR, that is, the location of the merge point meets the preset condition, the location of the merge point is considered as a final merge point location. Herein, the adjusted first width is actually the two-lane width.

Certainly, adjustment may be performed by a width other than the first width. For example, in the current scenario shown in FIG. 11(a), there is also a merge point between the left adjacent lane and the host lane. In addition to adjusting the first width to the two-lane width, a width for translation required by the left road edge may further need to be adjusted. In other words, the third width is the two-lane width, to obtain an actual LR location.

Figure 11B:
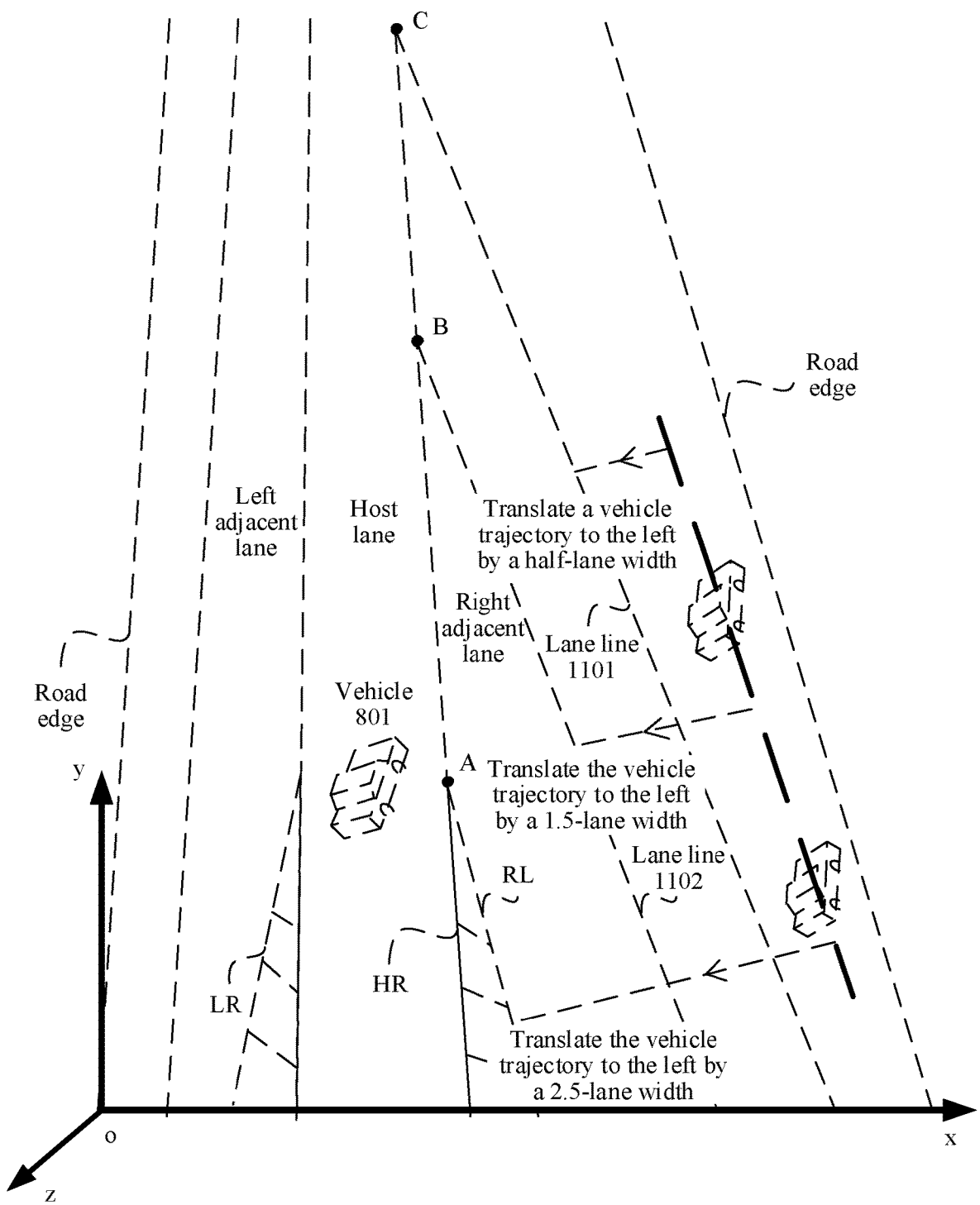

For another example, referring to FIG. 11(b), when there are a plurality of lanes (two lanes are shown in FIG. 11(b)) between the host lane in which the vehicle 801 is located and the detected vehicle trajectory, the points on the vehicle trajectory are translated to the left by a half-lane width. Thus, a lane line 1101 is actually obtained, and is considered as the preliminarily determined RL. In this way, the location of the merge point, for example, a location of the point C shown in FIG. 11(b), is preliminarily determined based on the preliminarily determined RL (actually the lane line 1101) and the right lane line of the host lane. A distance between the location of the preliminarily determined point C and the vehicle is relatively large, and the point C is not an actual merge point, as shown in FIG. 11(b). Therefore, the translation width of the half-lane width needs to be adjusted by a specific step, where the step may be one lane width. Herein, the translation width needs to be adjusted from a half-lane width to a 1.5-lane width. In other words, the points on the vehicle trajectory are translated to the left by the 1.5-lane width, that is, translated to the left by one lane width after the first translation to the left by the half-lane width, to obtain a lane line 1102. As shown in FIG. 11(b), after this adjustment, an obtained location of an intersection point (B) of the lane line 1102 and the HR still does not meet the preset condition. Therefore, the translation width further needs to be adjusted. Herein, the points on the vehicle trajectory are translated to the left by a 2.5-lane width, that is, translated to the left by one lane width after being translated to the left by the 1.5-lane width. As shown in FIG. 11(b), an actual RL is obtained after this adjustment. If a location of an intersection point A of the RL and the HR meets the preset condition, the location of the point A is considered as a final merge point location.

According to the road structure detection method provided in this embodiment of this application, the road structure information can be determined based on the boundary information of the host lane and the boundary information of the adjacent lane, where the boundary information includes the lane line information and/or the location information of the lane boundary. In other words, in this embodiment of this application, the road structure information can be determined without a high-definition map. Therefore, the vehicle can still determine the road structure in an area not covered in the high-definition map.

In an embodiment of this application, the road structure detection apparatus may be divided into functional modules based on the foregoing method example. For example, the functional modules may be obtained through division according to the functions, or two or more functions may be integrated into one processing module. The integrated module may be implemented in a form of hardware, or may be implemented in a form of a software functional module. Division into the modules in embodiments of this application is an example, and is merely logical function division. There may be other division in actual implementation.

Figure 12:
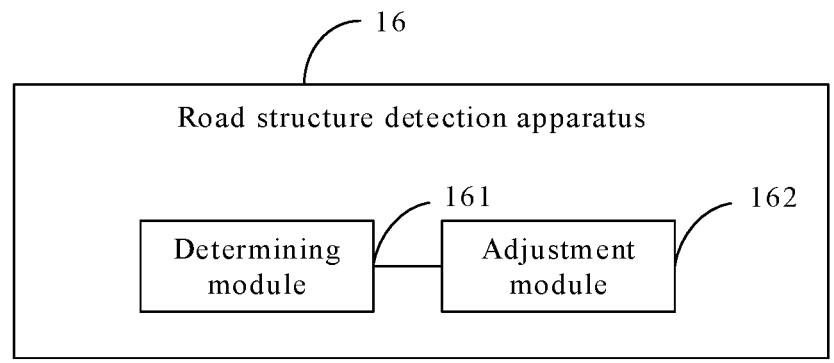
FIG. 12 is a schematic diagram of a structure of a road structure detection apparatus according to an embodiment of this application.

When the functional modules are obtained through division according to the functions, FIG. 12 is a schematic diagram of a possible structure of a road structure detection apparatus in the foregoing embodiment. As shown in FIG. 12, the road structure detection apparatus 16 includes a determining module 161 and an adjustment module 162. Certainly, the road structure detection apparatus 16 may further include another module (for example, a storage module), or the road structure detection apparatus may include fewer modules.

The determining module is configured to: determine boundary information of a host lane, where the boundary information of the host lane is used to represent a location of a boundary of the current lane; and determine boundary information of an adjacent lane, where the boundary information of the adjacent lane is used to represent a location of a boundary of the adjacent lane. The boundary information includes lane line information and/or location information of a lane boundary.

The determining module is further configured to determine road structure information based on the boundary information of the host lane and the boundary information of the adjacent lane, where the road structure information includes location information of a merge point of the host lane and the adjacent lane and/or a split point of the host lane and the adjacent lane.

In a possible design, the boundary information of the adjacent lane is determined based on detected vehicle trajectory information and/or road edge information, and the road edge information is used to represent a location of a road edge.

In a possible design, the boundary information of the adjacent lane includes at least one of the following:
 location information of a left lane line RL of a right adjacent lane;
 location information of a right lane line LR of a left adjacent lane;
 location information of a left boundary of the right adjacent lane; and
 location information of a right boundary of the left adjacent lane.

In a possible design, a first location of the RL is obtained by translating the road edge to the left by a first width; a second location of the RL is obtained by translating the vehicle trajectory to the left by a second width; or a third location of the RL is obtained by fusing the first location of the RL and the second location of the RL by using a preset algorithm.

A fourth location of the LR is obtained by translating the road edge to the right by a third width. Alternatively, a fifth location of the LR is obtained by translating the vehicle trajectory to the right by a fourth width. Alternatively, a sixth location of the LR is obtained by fusing the fourth location of the LR and the fifth location of the LR by using the preset algorithm.

A seventh location of the left boundary of the right adjacent lane is obtained by translating the road edge to the left by a fifth width. Alternatively, an eighth location of the left boundary is obtained by translating the vehicle trajectory to the left by a sixth width. Alternatively, a ninth location of the left boundary is obtained by fusing the seventh location of the left boundary and the eighth location of the left boundary by using the preset algorithm.

A tenth location of the right boundary of the left adjacent lane is obtained by translating the road edge to the right by a seventh width. Alternatively, an eleventh location of the right boundary is obtained by translating the vehicle trajectory to the right by an eighth width. Alternatively, a twelfth location of the right boundary is obtained by fusing the tenth location of the right boundary and the eleventh location of the right boundary by using the preset algorithm.

The first width is an integer multiple of a lane width, the second width is an odd multiple of a half-lane width, the third width is an integer multiple of the lane width, the fourth width is an odd multiple of the half-lane width, the fifth width is an integer multiple of the lane width, the sixth width is an odd multiple of the half-lane width, the seventh width is an integer multiple of the lane width, and the eighth width is an odd multiple of the half-lane width.

In a possible design, a distance between the merge point and a reference point is less than or equal to a first threshold, and/or a distance between the split point and the reference point is less than or equal to the first threshold. The reference point includes a vehicle.

In a possible design, the adjustment module is configured to: adjust the first width and/or the second width and/or the third width and/or the fourth width and/or the fifth width and/or the sixth width and/or the seventh width and/or the eighth width based on the first threshold; and adjust the merge point based on the adjusted first width and/or second width and/or third width and/or fourth width and/or fifth width and/or sixth width and/or seventh width and/or eighth width; and/or configured to: adjust the first width and/or the second width and/or the third width and/or the fourth width and/or the fifth width and/or the sixth width and/or the seventh width and/or the eighth width based on the first threshold; and adjust the split point based on the adjusted first width and/or second width and/or third width and/or fourth width and/or fifth width and/or sixth width and/or seventh width and/or eighth width.

In a possible design, the first threshold is determined by using a sensing range of a sensor, or the first threshold is a pre-configured value.

In a possible design, the boundary information of the adjacent lane is determined based on road prior data, and the road prior data includes the lane width.

Figure 13:
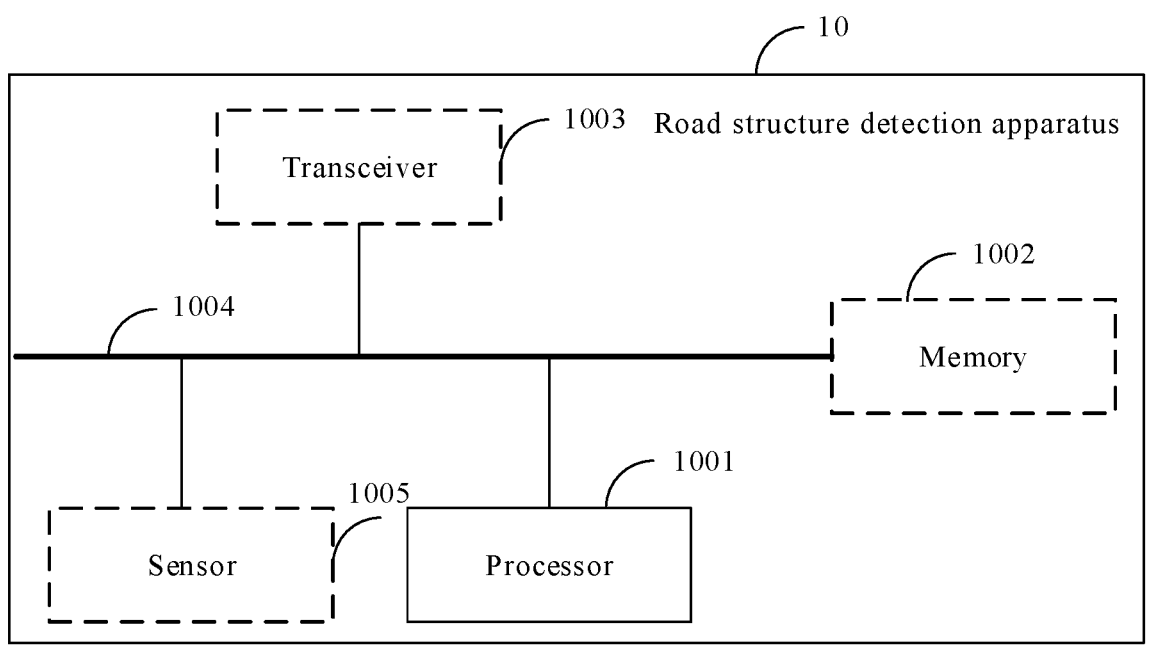
FIG. 13 is a schematic diagram of a structure of a road structure detection apparatus according to an embodiment of this application.

Refer to FIG. 13. This application further provides a road structure detection apparatus 10 including a processor 1001.

Optionally, the road structure detection apparatus 10 may further include a memory 1002.

The processor 1001 and the memory 1002 are connected to each other (for example, are connected to each other by using a bus 1004).

Optionally, the road structure detection apparatus 10 may further include a transceiver 1003, where the transceiver 1003 is connected to the processor 1001 and the memory 1002, and the transceiver is configured to receive or send data.

The processor 1001 may perform operations of any implementation corresponding to FIG. 9 and various feasible implementations thereof. For example, the processor 1001 is configured to perform operations of the determining module 161 and the adjustment module 162, and/or another operation described in embodiments of this application. The processor 1001 is further configured to control a sensor 1005, so that the sensor 1005 obtains some sensing information. The sensor 1005 may be included in the road structure detection apparatus 10 or may be an external sensor.

When the road structure detection apparatus 10 includes the sensor 1005, that is, the sensor 1005 is a built-in sensor of the road structure detection apparatus 10, the sensor 1005 may optionally integrate all data processing functions in the foregoing method embodiments. In this case, the road structure detection apparatus 10 may not include the processor 1001. The sensor 1005 may be configured to perform the foregoing method embodiment, that is, configured to perform operations of the determining module 161 and the adjustment module 162, and/or another operation described in embodiments of this application. In this embodiment of this application, the data processing may be a fusion operation. To be specific, the sensor 1005 may perform a fusion operation on boundary information of an adjacent lane determined based on road edge information and boundary information of the adjacent lane determined based on vehicle trajectory information, to improve accuracy of the boundary information of the adjacent lane. The data processing may alternatively be another data processing process in the foregoing method embodiments. For example, when a location of a preliminarily determined merge point (or split point) is greater than or equal to a first threshold, the sensor 1005 may be configured to adjust a road edge location and/or a width for translation required for the vehicle trajectory. A specific data processing function that can be performed by the sensor 1005 is not limited in this embodiment of this application.

As described above, the sensor 1005 may refer to a visual sensor (for example, a camera) or a sensor such as a radar, or another sensor with a similar function.

Certainly, the sensor 1005 may not integrate any data processing function, or integrate some data processing functions. In this case, the sensor 1005 combined with the processor may perform the foregoing method embodiment, and the road structure detection apparatus 10 needs to include the sensor 1005 and the processor 1001.

In one example, the sensor 1005 is a conventional sensor without a data function. In a possible implementation, the sensor 1005 is configured to determine road edge information and/or vehicle trajectory information. In other words, the sensor 1005 is configured to: determine boundary information of an adjacent lane based on the road edge information and/or the vehicle trajectory information; and determine a location of a merge point (and/or a split point) based on the boundary information of the adjacent lane and boundary information of a host lane. A fusion operation is involved when the boundary information of the adjacent lane is determined based on the road edge information and the vehicle trajectory information.

In another example, the sensor 1005 may have some data processing functions, and the processor may have some data processing functions. For example, the sensor 1005 may perform data processing based on a location of a road edge collected by the sensor 1005 to obtain boundary information of an adjacent lane. In this case, the processor may be configured to perform a fusion operation or other data processing functions. Specific work division (that is, processing for which part of data) between the sensor 1005 and the processor 1001 is not limited in this embodiment of this application.

For specific descriptions of the processor, the memory, the bus, and the transceiver, refer to the foregoing descriptions. Details are not described herein again.

This application further provides a road structure detection apparatus including a non-volatile storage medium and a central processing unit. The non-volatile storage medium stores an executable program. The central processing unit is connected to the non-volatile storage medium, and executes the executable program to implement the road structure detection method in embodiments of this application.

Another embodiment of this application further provides a computer-readable storage medium. The computer-readable storage medium includes one or more pieces of program code including instructions. When a processor executes the program code, the road structure detection apparatus performs the road structure detection method shown in FIG. 9.

In another embodiment of this application, a computer program product is further provided, where the computer program product includes computer-executable instructions, and the computer-executable instructions are stored in a computer-readable storage medium. At least one processor in the road structure detection apparatus may read the computer-executable instructions from the computer-readable storage medium, and the at least one processor executes the computer-executable instructions to enable the road structure detection apparatus to perform corresponding steps in the road structure detection method shown in FIG. 9.

All or some of the foregoing embodiments may be implemented by using software, hardware, firmware, or any combination thereof. When a software program is used to implement the embodiments, the embodiments may be all or partially implemented in a form of a computer program product. The computer program product includes one or more computer instructions. When the computer program instructions are loaded and executed on a computer, all or some of the procedures or functions according to embodiments of this application are generated.

The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage apparatus, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

The foregoing descriptions about implementations allow a person skilled in the art to understand that, for the purpose of convenient and brief description, division into the foregoing functional modules is taken as an example for illustration. In actual application, the foregoing functions may be allocated to different modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples.

For example, division into the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may be one or more physical units, that is, may be located in one place, or may be distributed on a plurality of different places. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A road structure detection method comprising:
   determining boundary information of a host lane, wherein the boundary information of the host lane represents a location of a boundary of the host lane;
   determining boundary information of an adjacent lane based on information regarding trajectory of a vehicle and location of an edge of a road comprising the host and adjacent lanes,
      wherein the boundary information of the adjacent lane represents a location of a boundary of the adjacent lane, and
      wherein the boundary information of the adjacent lane comprises a location of one or more of (a) a left lane line (RL) of a right adjacent lane, (b) a right lane line (LR) of a left adjacent lane, (c) a left boundary of the right adjacent lane, and (d) a right boundary of the left adjacent lane,
      wherein the location of the RL is obtained by (a) translating a road edge to the left by a first width that is an integer multiple of a lane width, (b) translating a vehicle trajectory to the left by a second width that is an odd multiple of a half-lane width, or (c) fusing the first location of the RL and the second location of the RL,
      wherein the location of the LR is obtained by (a) translating the road edge to the right by a third width that is an integer multiple of the lane width, (b) translating the vehicle trajectory to the right by a fourth width that is an odd multiple of the half-lane width, or (c) fusing the fourth location of the LR and the fifth location of the LR,
      wherein the location of the left boundary of the right adjacent lane is obtained by (a) translating the road edge to the left by a fifth width that is an integer multiple of the lane width, (b) translating a vehicle trajectory to the left by a sixth width that is an odd multiple of the half-lane width, or (c) fusing the seventh location of the left boundary and the eighth location of the left boundary using a preset algorithm, and
      wherein the location of the right boundary of the left adjacent lane is obtained by (a) translating the road edge to the right by a seventh width that is an integer multiple of the lane width, (b) translating the vehicle trajectory to the right by an eighth width that is an odd multiple of the half-lane width, or (c) by fusing the tenth location of the right boundary and the eleventh location of the right boundary using the preset algorithm;
   determining road structure information based on the boundary information of the host lane and the boundary information of the adjacent lane,
      wherein the road structure information comprises location information of a merge point of the host lane and the adjacent lane, and/or a split point of the host lane and the adjacent lane,
   generating a driving policy based on the road structure information; and
   controlling driving of the vehicle based on action instructions associated with the driving policy.

2. The road structure detection method according to claim 1, wherein a distance between the merge point and a reference point is less than or equal to a first threshold, and/or a distance between the split point and the reference point is less than or equal to the first threshold, and the reference point comprises the vehicle.

3. The road structure detection method according to claim 2, wherein the first threshold is determined by using a sensing range of a sensor, or the first threshold is a preconfigured value.

4. The road structure detection method according to claim 1, further comprising:
   adjusting at least one of the widths based on a first threshold that is a distance between a reference point and either the merge or split point; and
   adjusting the merge point and/or the split point based on the at least one of the widths.

5. The road structure detection method according to claim 1, wherein the information for determining the boundary information of the adjacent lane includes road prior data, and wherein the road prior data comprises the lane width.

6. An apparatus comprising:
   a memory configured to store instructions; and one or more processors coupled to the memory and configured to execute the instructions to cause the apparatus to:
  determine boundary information of a host lane, wherein the boundary information of the host lane represents a location of a boundary of the host lane;
  determine boundary information of an adjacent lane based on information regarding trajectory of a vehicle and location of an edge of a road comprising the host and adjacent lanes,
    wherein the boundary information of the adjacent lane represents a location of a boundary of the adjacent lane, and
    wherein the boundary information of the adjacent lane comprises a location of one or more of (a) a left lane line (RL) of a right adjacent lane, (b) a right lane line (LR) of a left adjacent lane, (c) a left boundary of the right adjacent lane, and (d) a right boundary of the left adjacent lane,
    wherein the location of the RL is obtained by (a) translating a road edge to the left by a first width that is an integer multiple of a lane width, (b) translating a vehicle trajectory to the left by a second width that is an odd multiple of a half-lane width, or (c) fusing the first location of the RL and the second location of the RL,
    wherein the location of the LR is obtained by (a) translating the road edge to the right by a third width that is an integer multiple of the lane width, (b) translating the vehicle trajectory to the right by a fourth width that is an odd multiple of the half-lane width, or (c) fusing the fourth location of the LR and the fifth location of the LR,
    wherein the location of the left boundary of the right adjacent lane is obtained by (a) translating the road edge to the left by a fifth width that is an integer multiple of the lane width, (b) translating a vehicle trajectory to the left by a sixth width that is an odd multiple of the half-lane width, or (c) fusing the seventh location of the left boundary and the eighth location of the left boundary using a preset algorithm, and
    wherein the location of the right boundary of the left adjacent lane is obtained by (a) translating the road edge to the right by a seventh width that is an integer multiple of the lane width, (b) translating the vehicle trajectory to the right by an eighth width that is an odd multiple of the half-lane width, or (c) by fusing the tenth location of the right boundary and the eleventh location of the right boundary using the preset algorithm;
  determine road structure information based on the boundary information of the host lane and the boundary information of the adjacent lane,
    wherein the road structure information comprises location information of a merge point of the host lane and the adjacent lane and/or a split point of the host lane and the adjacent lane,
  generate a driving policy based on the road structure information; and
  control driving of the vehicle based on action instructions associated with the driving policy.

7. The apparatus according to claim 6, wherein a distance between the merge point and a reference point is less than or equal to a first threshold, and/or a distance between the split point and the reference point is less than or equal to the first threshold, and the reference point comprises the vehicle.

8. The apparatus according to claim 7, wherein the first threshold is determined by using a sensing range of a sensor, or the first threshold is a pre-configured value.

9. The apparatus according to claim 6, wherein the instructions further cause the apparatus to:
  adjust at least one of the widths based on a first threshold that is a distance between a reference point and either the merge or split point; and
  adjust the merge point and/or the split point based on the at least one of the widths.

10. The apparatus according to claim 6, wherein the information for determining the boundary information of the adjacent lane includes road prior data, and wherein the road prior data comprises the lane width.

11. A non-transitory computer-readable medium having computer-executable instructions stored which when executed by a processor of an apparatus, cause the apparatus to:
  determine boundary information of a host lane, wherein the boundary information of the host lane represents a location of a boundary of the host lane;
  determine boundary information of an adjacent lane based on information regarding trajectory of a vehicle and location of an edge of a road comprising the host and adjacent lanes,
    wherein the boundary information of the adjacent lane represents a location of a boundary of the adjacent lane, and
    wherein the boundary information of the adjacent lane comprises a location of one or more of (a) a left lane line (RL) of a right adjacent lane, (b) a right lane line (LR) of a left adjacent lane, (c) a left boundary of the right adjacent lane, and (d) a right boundary of the left adjacent lane,
    wherein the location of the RL is obtained by (a) translating a road edge to the left by a first width that is an integer multiple of a lane width, (b) translating a vehicle trajectory to the left by a second width that is an odd multiple of a half-lane width, or (c) fusing the first location of the RL and the second location of the RL,
    wherein the location of the LR is obtained by (a) translating the road edge to the right by a third width that is an integer multiple of the lane width, (b) translating the vehicle trajectory to the right by a fourth width that is an odd multiple of the half-lane width, or (c) fusing the fourth location of the LR and the fifth location of the LR,
    wherein the location of the left boundary of the right adjacent lane is obtained by (a) translating the road edge to the left by a fifth width that is an integer multiple of the lane width, (b) translating a vehicle trajectory to the left by a sixth width that is an odd multiple of the half-lane width, or (c) fusing the seventh location of the left boundary and the eighth location of the left boundary using a preset algorithm, and
    wherein the location of the right boundary of the left adjacent lane is obtained by (a) translating the road edge to the right by a seventh width that is an integer multiple of the lane width, (b) translating the vehicle trajectory to the right by an eighth width that is an odd multiple of the half-lane width, or (c) by fusing the tenth location of the right boundary and the eleventh location of the right boundary using the preset algorithm;

determine road structure information based on the boundary information of the host lane and the boundary information of the adjacent lane,
wherein the road structure information comprises location information of a merge point of the host lane and the adjacent lane and/or a split point of the host lane and the adjacent lane;
generate a driving policy based on the road structure information; and
control driving of the vehicle based on action instructions associated with the driving policy.

12. The non-transitory computer-readable medium according to claim 11, wherein a distance between the merge point and a reference point is less than or equal to a first threshold, and/or a distance between the split point and the reference point is less than or equal to the first threshold, and the reference point comprises the vehicle.

13. The non-transitory computer-readable medium according to claim 12, wherein the first threshold is determined by using a sensing range of a sensor, or the first threshold is a pre-configured value.

14. The non-transitory computer-readable medium according to claim 11, wherein the information for determining the boundary information of the adjacent lane includes road prior data, and wherein the road prior data comprises the lane width.

15. The non-transitory computer-readable medium according to claim 11, wherein when the computer-executable instructions are executed by the processor of the apparatus, the apparatus to further caused to:
adjust at least one of the widths based on a first threshold that is a distance between a reference point and either the merge or split point; and
adjust the merge point and/or the split point based on the at least one of the widths.

* * * * *